US010649110B2

(12) United States Patent
Zhang

(10) Patent No.: US 10,649,110 B2
(45) Date of Patent: May 12, 2020

(54) DETERMINATION OF SHALE CONTENT OF FORMATION FROM DISPERSIVE MULTI-FREQUENCY DIELECTRIC MEASUREMENTS

(71) Applicant: BAKER HUGHES INCORPORATED, Houston, TX (US)

(72) Inventor: Yinxi Zhang, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 558 days.

(21) Appl. No.: 15/374,419

(22) Filed: Dec. 9, 2016

(65) Prior Publication Data

US 2018/0164466 A1 Jun. 14, 2018

(51) Int. Cl.
*G01V 3/38* (2006.01)
*G01V 3/28* (2006.01)
(Continued)

(52) U.S. Cl.
CPC .......... *G01V 3/38* (2013.01); *G01V 3/28* (2013.01); *G01V 3/30* (2013.01); *Y02A 90/342* (2018.01); *Y02A 90/344* (2018.01)

(58) Field of Classification Search
CPC ... G01V 3/38; G01V 3/28; G01V 3/30; Y02A 90/342; Y02A 90/344; E21B 49/00
See application file for complete search history.

(56) References Cited

U.S. PATENT DOCUMENTS 5,811,973 A 9/1998 Meyer, Jr.
6,166,546 A 12/2000 Scheihing et al.
(Continued)

FOREIGN PATENT DOCUMENTS

WO 2016108909 A1 7/2016

OTHER PUBLICATIONS

Sherman, Michael, "A Model for the Frequency Dependence of the Dielectric Permittivity of Reservoir Rocks," The Log Analyst, pp. 358-369 (Sep.-Oct. 1988).
(Continued)

*Primary Examiner* — Andrew Schechter
*Assistant Examiner* — Lynda Dinh
(74) *Attorney, Agent, or Firm* — Mossman Kumar & Tyler PC

(57) ABSTRACT

Methods and apparatus for evaluating a volume of an earth formation wherein the volume comprises a fluid-saturated rock matrix including clay particles. Methods include making measurements of complex permittivity at a plurality of frequencies using an electromagnetic tool in a borehole penetrating the earth formation; and estimating a plurality of parameters of interest simultaneously using the measurements at the plurality of frequencies and a mixing model accounting for electrical effects on the measurements caused by the clay particles. The plurality may include at least: i) water saturation; and ii) resistivity of formation water. Parameters of interest may comprise at least one of: i) an electrical parameter of the volume; and ii) a textural parameter of the volume. Methods may include modeling for electrical effects caused by at least one of: i) a surface conductivity of the clay particles; and ii) a textural property of the clay particles.

17 Claims, 12 Drawing Sheets

(51) Int. Cl.
    *E21B 49/00*      (2006.01)
    *G01V 3/30*       (2006.01)

(56)            References Cited

U.S. PATENT DOCUMENTS

| 8,717,029 B2 | 5/2014 | Chae et al. |
| 2012/0065888 A1 | 3/2012 | Wu et al. |
| 2013/0200890 A1 | 8/2013 | Hursan |
| 2015/0212228 A1* | 7/2015 | Seleznev .............. G01N 33/241 |
| | | 702/7 |
| 2016/0097876 A1* | 4/2016 | Freed ........................ G01V 3/24 |
| | | 703/2 |
| 2016/0187521 A1* | 6/2016 | Homan .................... G01V 3/28 |
| | | 324/338 |

OTHER PUBLICATIONS

Giordano, Stefano, "Effective medium theory for dispersions of dielectric ellipsoids," Jnl of Electrostatics 58, pp. 59-76 (2003).

* cited by examiner

DETERMINATION OF SHALE CONTENT OF FORMATION FROM DISPERSIVE MULTI-FREQUENCY DIELECTRIC MEASUREMENTS

FIELD OF THE DISCLOSURE

This disclosure generally relates to exploration and production of hydrocarbons involving investigations of regions of an earth formation penetrated by a borehole. More specifically, the disclosure relates to interpretation of dielectric measurements of an earth formation using a logging tool in a borehole.

BACKGROUND OF THE DISCLOSURE

Electrical earth borehole logging is well known and various devices and various techniques have been described for this purpose. Broadly speaking, there are two categories of electrical logging apparatus. In the first category, one or more measurement electrodes—current source(s) or sink (s)—are used in conjunction with a return electrode (which may be a diffuse electrode such as a logging tool's body or mandrel). A measurement current flows in a circuit that connects a current source to the measurement electrode(s), through the earth formation to the return electrode, and back to the current source in the tool. In a second category, that of inductive measuring tools, an antenna within the measuring instrument induces a current flow within the earth formation. The magnitude of the induced current is detected using either the same antenna or a separate receiver antenna. The measured responses are affected by properties of the earth formation including electrical conductivity, magnetic permeability, dielectric permittivity and the pore volume or porosity of the rock matrix and water saturation.

The dielectric constant of the formation may be estimated by transmitting an electromagnetic (EM) wave into the formation, and receiving it at one or more receivers (e.g., at receiver antennas). Then, the attenuation and phase shift between the received signals and the transmitted signals are determined, which are used to estimate the dielectric constant of the formation. Alternatively, the attenuation and phase shift between spaced receivers may be used to estimate the dielectric constant of the formation.

By combining complex permittivity measurements with measurements from other borehole devices (e.g., total formation porosity), the water saturation of the formation and resistivity of formation water can be estimated.

SUMMARY OF THE DISCLOSURE

In aspects, the present disclosure is related to a method for evaluating an earth formation. The evaluation is carried out using complex dielectric measurements. The complex dielectric measurements are modeled using a mixing model approximating the dielectric behavior of the formation.

Aspects include methods of evaluating a volume of an earth formation wherein the volume comprises a fluid-saturated rock matrix including clay particles. Methods include making measurements of complex permittivity at a plurality of frequencies using an electromagnetic tool in a borehole penetrating the earth formation. The tool may be configured to transmit signals into the volume at a plurality of frequencies. Methods may include estimating a plurality of parameters of interest simultaneously using the measurements at the plurality of frequencies and a mixing model accounting for electrical effects on the measurements caused by the clay particles. That is, the processing of the measurements (e.g., analysis, inversion), outputs the parameters at the same time. Parameters of interest may comprise at least one of: i) an electrical parameter of the volume; and ii) a textural parameter of the volume. The plurality of parameters may include both water saturation and resistivity of formation water. Methods may include modeling for electrical effects caused by at least one of: i) a surface conductivity of the clay particles; and ii) a textural property of the clay particles. Method embodiments may include using the at least one processor to perform at least one of: i) storing the at least one property in a computer memory; ii) transmitting the at least one property uphole; or iii) displaying of the at least one property to an operating engineer. Methods may include modeling for electrical effects caused by at least one of: i) a surface conductivity of the clay particles; and ii) a textural property of the clay particles.

The mixing model may be derived from a relationship of an effective permittivity of the volume to a corresponding volumetric factor (e.g., volume fraction) and a corresponding permittivity of each of a plurality of components of the volume. The components may comprise at least formation water and at least one of: i) the rock matrix of the formation; and ii) formation hydrocarbons. The model may relate the effective permittivity of the volume to a function of the corresponding permittivity of each of a plurality of components of the volume as modified by an operator. The operator may comprise a root of degree $C_{EXP}$, where $C_{EXP}$ is a positive rational number. Methods may include estimating a value for $C_{EXP}$ and the at least one other parameter of interest including performing an inversion using the measurements. Methods may include using at least one processor to estimate an effective permittivity and an effective conductivity of the volume.

Methods may include estimating the at least one parameter of interest in dependence upon the effective permittivity; the effective conductivity; an estimated porosity; and an estimated temperature. Methods may include estimating a permittivity of a rock matrix within the volume using at least one of: i) lithology information, and ii) a volumetric analysis of the volume. The at least one parameter of interest may comprise at least one of: i) resistivity of formation water; ii) water saturation; iii) CEC; iv) a textural parameter of the clay particles; v) permittivity of formation water; vi) clay type of clay particles. The model may relate dispersion between the measurements to the at least one parameter of interest. The at least one parameter of interest may comprise resistivity of formation water, water saturation, and permittivity of the rock matrix; and estimating the at least one permittivity parameter may include using the measurements to perform an inversion for a value of the resistivity of formation water, a value of the water saturation, a value of the permittivity of the rock matrix, and a value of the $C_{EXP}$ simultaneously.

Methods may include using a stochastic correlation library correlating the at least one parameter of interest to a property of the clay particles to estimate the property. Methods may include conveying the electromagnetic tool in the borehole. The electromagnetic tool may use electrical induction.

Aspects of the disclosure include apparatus for evaluating a volume of an earth formation wherein the volume comprises a fluid-saturated rock matrix including clay particles. Apparatus may include a carrier configured to be conveyed in a borehole penetrating the earth formation; an electromagnetic tool disposed on the carrier and configured to make measurements of complex permittivity of a volume of the earth formation proximate the tool at a plurality of frequencies; and at least one processor. The at least one processor may be configured to: estimate a plurality of parameters of interest simultaneously using the measurements at the plurality of frequencies and a mixing model accounting for electrical effects on the measurements caused by the clay particles. Parameters of interest may comprise at least one of: i) an electrical parameter of the volume; and ii) a textural parameter of the volume. The plurality of parameters may include both water saturation and resistivity of formation water. The at least one processor may be configured to model for electrical effects caused by at least one of: i) a surface conductivity of the clay particles; and ii) a textural property of the clay particles.

Some embodiments include a non-transitory computer-readable medium product accessible to the processor and having instructions thereon that, when executed, causes the at least one processor to perform methods described above. Apparatus embodiments may include at least one processor and a computer memory accessible to the at least one processor comprising a computer-readable medium having instructions thereon that, when executed, causes the at least one processor to perform methods described above.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1A:
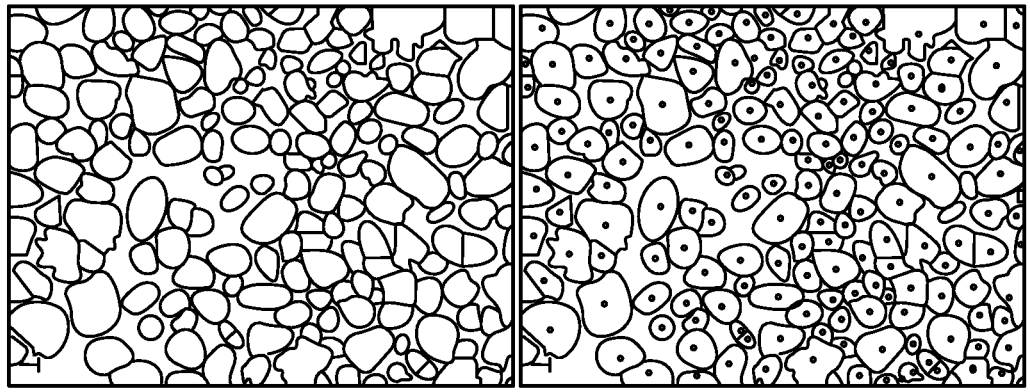
FIGS. 1A & 1B illustrate the physical differences between sand and clay particles.

This disclosure generally relates to exploration for hydrocarbons involving electromagnetic investigations of a volume of an earth formation adjacent to a borehole penetrating the formation. These investigations may include estimating at least one parameter of interest of the volume, such as a permittivity parameter.

The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein. Indeed, as will become apparent, the teachings of the present disclosure can be utilized for a variety of well tools and in all phases of well construction and production. Accordingly, the embodiments discussed below are merely illustrative of the applications of the present disclosure.

Dielectric permittivity arises in sedimentary rock from the ability of electric dipoles to align themselves with an alternating electromagnetic field, such as one induced by a downhole tool. Several phenomena contribute to $\varepsilon_r$ in a porous earth formation. One contribution is the rotation of dipolar molecules (e.g., water). In the presence of an applied electric field, a dipolar molecule will rotate to align the positive and negative poles of the molecule with the applied electric field. In such an alternating field, the molecule will rotate constantly with the variation in polarity of the applied field. While the molecule is in rotation to align with the applied field, the movement of the charge represents electrical charges moving in phase with the applied field and are therefore carrying current and contributing to the composite formation conductivity. Once aligned with the field, the polarized molecules represent fixed or stored charges and thereby contribute to the formation permittivity until the polarity of the alternating applied field is reversed. At this time, the molecules again rotate contributing again to composite formation conductivity. The motions of ions also contribute, compounding these effects.

Measured values of $\varepsilon_r$ are dependent upon the frequency of the applied field. Dispersion of dielectric constant may be due to electrical polarization generally falling in one of three categories: interfacial polarization, which is typically dominant at KHz to MHz frequencies; molecular orientation, which is mainly related to dipole moment of molecules and is more pronounced at frequencies in the range of MHz to GHz; and electronic polarization, which is due to the resonance of each atom in the media and thus negligible at frequencies lower than 1 GHz.

At low frequencies, dielectric constants can be quite high since the water molecules can easily rotate and align themselves with the field before the polarity of the field reverses. Similarly, dissolved ions can migrate to the boundary of the pore space and accumulate against the pore wall long before the polarity of the field reverses. Therefore, at low frequencies, molecules spend most of the AC cycle in a fixed orientation or position and only a small fraction of the time moving.

At high frequencies, the polarity of the applied field will reverse before mobile charges come to rest. In this situation, the mobile charges spend most of their time moving in phase with the external electromagnetic field, thereby increasing the conductivity and resulting in a lower measured dielectric constant. The phenomenon of changing dielectric and conductivity values with frequency is known as dispersion. The frequency at which the rotating molecules or mobile ions can no longer keep pace with the oscillating field is known as the "relaxation frequency."

Geophysical media within an earth formation may be mixtures of materials, with each material exhibiting different dielectric characteristics. In remote-sensing applications, it may be desirable to approximate the microscopically complicated mixture as macroscopically homogeneous volume and characterize it by an effective permittivity. One constituent in these mixtures is typically water. The dielectric properties of the volume are sensitive to small variations in the fractional component volumes, because the permittivity of water is usually very different than that of the other components (e.g., hydrocarbons and dry rock). For example, fresh water at room temperature has a dielectric constant value around 75, and dry sands about 5.

Dielectric logging uses the contrast between dielectric constant of water, rock and oil (or other hydrocarbons) to estimate the formation water content. The permittivity of the formation can be considered as a complex quantity which contains dielectric constant and conductivity in its real and imaginary component $$\tilde{\varepsilon}_r(\omega) = \varepsilon_r(\omega) + i\frac{\sigma(\omega)}{\omega\varepsilon_0} \quad (1)$$

where $\tilde{\varepsilon}_r$ is the complex value representing relative permittivity, $\varepsilon_r$ is relative dielectric constant, $\sigma$ is electrical conductivity, 107 is angular frequency and $\varepsilon_0$ is dielectric constant of vacuum. In current dielectric logging tools, the magnitude and phase of an electromagnetic wave propagating in the formation is measured at multiple receivers. The relative magnitude and phase of a detected signal at the respective receivers is used to obtain $\varepsilon_r$ and $\sigma$, which are functions of frequency due to the dispersive behavior of the formation. In practice, the measurement is performed at multiple frequencies in order to obtain a good estimate of the dispersive behavior.

The dispersive behavior of the formation is a result of the properties of its constituents (water, rock matrix and hydrocarbon) as well as the volume fraction of each of these phases, their geometry and distribution within a representative volume of the formation. However, the mixture of these three phases exhibits a dispersive behavior different from the weighted average of dispersive behavior of each. There exist several mixing laws (or mixing models) that relate the dielectric behavior of a mixture to the properties of its constituents.

Measuring the dielectric dispersive behavior of the formation and fitting it to mixing laws that are shown to be representative of the behavior of the formation under study provides information on the volume fraction of each component and formation texture information. This information is invaluable for estimating the hydrocarbon content in the reservoir under study.

Mixing laws are used to estimate an effective permittivity of a composite of inclusions in a host matrix. In the oil and gas industry, petrophysicists usually exploit mixing laws to the mixture of formation matrix and fluids in the pores. Several dielectric models have been set forth which attempt to approximate the permittivity of mixtures in terms of the known dielectric constants and volume fractions of the constituents. Some example mixing models include the Complex Refractive Index Model (CRIM) and Looyenga-Landau-Lifshitz model, along with other exponential models, and variants of the Maxwell-Garnett model, including the Coherent Potential model, and the Symmetric Bruggeman Model.

CRIM may be the most commonly used of these. CRIM is an empirical formula describing complex permittivity of the entire media as a superimposition from the product of volumetric factor and permittivity of each component. CRIM has been validated in a laboratory setting and coincides with other effective medium approaches in sandstone analysis. U.S. Pat. No. 5,144,245 to M. M. Wisler discloses the use of the Complex Refractive Index Model (CRIM) as a means for correcting resistivity measurements for dielectric effects where the resistivity amplitude and phase data are taken at a single frequency. Although applicability of CRIM for all formation types is not certain, it is widely used in clean sand formation evaluation due to its simplicity.

Velocity of the electromagnetic wave is proportional to inverse square root of permittivity. A plane wave solution will have the form $$V = Ce^{ikx} \quad (2)$$

where
V=a field variable;
C=a constant
e=the naperian log base
i=the square root of 1;
x=the distance traveled; and $$k = [(\omega^2 \mu_o \mu_r \varepsilon_o \varepsilon_r) - (i\omega \mu_o \mu_r \sigma)]^{1/2}$$

where:
c=the speed of light=2.999 $10^8$ (meters/second);
$\mu_o$=the magnetic permeability of free space=$4\pi \times 10^{-7}$ [N/A$^2$];
$\mu_r$=the relative permeability (which is 1.0 for free space and most earth materials);
$\varepsilon_o$=the electric permittivity of free space=$1/(\mu_o C^2)$ =$8.854 \times 10^{-12}$ [F/m];
$\varepsilon_r$=the relative dielectric constant (which is 1.0 in free space);
$\omega$=the angular frequency of the applied field; and
$\sigma$=the conductivity.

The term k can be rewritten in terms of a relative complex dielectric constant, $$\tilde{\varepsilon}_r = \varepsilon_r - i\sigma(1/\omega\varepsilon_o). \quad (3)$$

The CRIM model is a simple model that obtains the effective permittivity of a mixture based on the weighted average of its constituents. It simplifies the mixture as a layered composite with each layer having properties that correspond to a phase in the mixture and a thickness that is proportional to the volume fraction of each phase. The speed of electromagnetic wave in a material is related to the speed in vacuum through $$\frac{c}{c_0} = (\Gamma_r \tilde{\varepsilon}_r)^{-0.5},$$

where c is the speed of electromagnetic wave in material, $c_0$ the speed of electromagnetic wave in vacuum, $\Gamma_r$ is the relative permeability and $\tilde{\varepsilon}_r$ is the complex relative permittivity. The total travel time for the electromagnetic wave is seen as the sum of the time it takes for the wave to travel in each layer (phase). Using this hypothesis and assuming the relative permeability to be the same for all phases result in $$\tilde{\varepsilon}_{eff}^{0.5} = \sum_{i=1}^{N} f_i \tilde{\varepsilon}_i^{0.5} \quad (4)$$

where $\tilde{\varepsilon}_i$ is dielectric property for each phase present in the mixture and $f_i$ is volume fraction of each phase. In case of a mixture of solid matrix (m), water (w) and oil (o) the equation becomes $$\tilde{\varepsilon}_{eff}^{0.5} = (1-\varphi)\tilde{\varepsilon}_m^{0.5} + \varphi S_W \tilde{\varepsilon}_w^{0.5} + \varphi(1-S_W)\tilde{\varepsilon}_o^{0.5}. \quad (5)$$

Under direct current, only the water portion is substantially conductive, and rewriting Eq. (5) equation for its real part at frequency of zero and assuming $\sigma_m = \sigma_o = 0$ leads to $$\sigma_{\mathit{eff}}^{0.5} = \varphi S_W \sigma_w^{0.5}. \tag{6}$$

Water permittivity is dispersive with respect to frequency, and the dispersive behavior can be well defined by Debye's Model, $$\varepsilon^*_{Water}(\omega) = \varepsilon_\infty + \frac{\varepsilon_s - \varepsilon_\infty}{1 + i\omega\tau} + j\frac{1}{\omega\varepsilon_0 Rz}. \tag{7}$$

Approaching a frequency of 1 GHz, impact from the imaginary term in the above equation diminishes since frequency in the dominator is too high. Hence the model becomes salinity independent. The Klein-Swift model explicitly described how $\sigma_w$, $\varepsilon_s$, $\varepsilon_\infty$, and $\tau$ are influenced by temperature and water salinity, but fails to account for the fact that shale content and CEC will also have a critical impact on $\sigma_w$, as described in further detail below.

Although the mixing models above have been generally relatively successful in modeling sandstone formations, the existence of shale in the formation has a dramatic impact on the formation electrical properties. CRIM, for example, loses generality when the composition of grains and fluids in the volume increases in complexity, such as, for example, the compositions corresponding to shale or shaly sand.

More particularly, shale normally enhances the dispersive behavior of permittivity and conductivity. Reasons for this effect include the geometrical and textural complexity of clay particles in the shale and the significant capability to absorb water demonstrated by a typical clay type, e.g., smectite. Consequently, investigation of formation dielectric responses from shaly (that is, clay containing) volumes would be greatly improved by a mixing model accounting for electrical effects on the measurements caused by the clay particles.

Figure 1B:
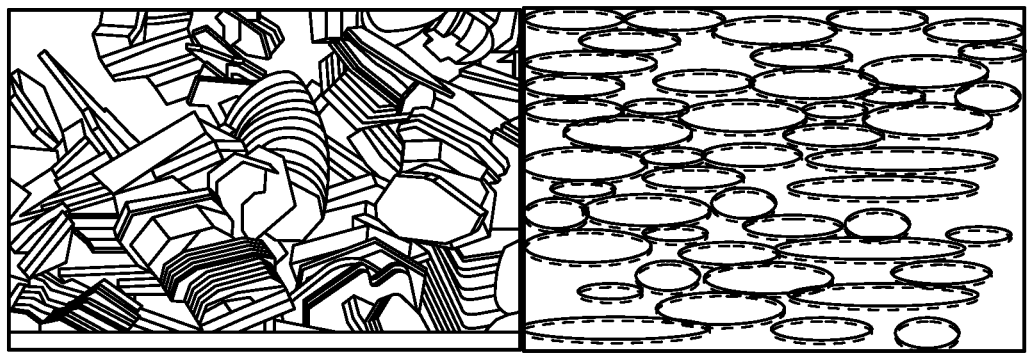

FIGS. 1A & 1B illustrate the physical differences between sand and clay particles may be readily observed. Referring to FIG. 1A, sandstone particles 101 may be approximated by spheres centered about center of mass. FIG. 1B illustrates clay particles 103 in illite. In contrast to sandstone particles 101, the clay particles, are flat and irregular and produce conductive surface effects not found in sand particles. In accordance with aspects of the present disclosure, a mixing model approximating the dielectric behavior of the formation by taking into account both the textural properties of clay minerals and the effect due to conductive surfaces of clay.

Aspects of the present disclosure relate to the employment of the information contained in dielectric dispersion measurements of a volume of an earth formation to estimate an electrical parameter of the volume, a textural parameter of the volume, and/or other parameters of interest of the volume. General aspects include method embodiments for evaluating an earth formation using complex dielectric measurements, wherein the complex dielectric measurements are modeled using a mixing model approximating the dielectric behavior of the formation by taking into account both the textural properties of clay minerals, such as shape and size of particles, and the effect due to conductive surfaces of clay. Parameters of the volume of interest of the formation affecting dielectric behavior, referred to herein as 'electrical parameters', include water saturation, water conductivity, water permittivity, permittivity of dry rock, permittivity of hydrocarbons, cation exchange capacity ('CEC'), and total porosity. As dielectric dispersive behavior of the volume is sensitive to these parameters, measuring the dielectric behavior of the formation at multiple frequencies provides a means to quantify these parameters.

Typically, the dielectric constants of the rock minerals are constant real values but water permittivity is a complex number due to dielectric loss and conductive loss, which results in a complex effective permittivity for the mixture. This is reflective of the dependence of the response of the materials to the frequency of the electric field. Since the response of materials to alternating electromagnetic fields is characterized by a complex permittivity, it is natural to separate its real and imaginary parts, which is done by convention in the following way:

$$\varepsilon(\omega) = \varepsilon'(\omega) - i\varepsilon''(\omega) \tag{8}$$

wherein $\varepsilon'$ is the real part of the permittivity, which is related to the stored energy within the medium and $\varepsilon''$ is the imaginary part of the permittivity, which is related to the dissipation (or loss) of energy within the medium.

Aspects of the present disclosure include a petro-physical model configured for the identification of clay effects on formation permittivity. Furthermore, inversion based on the model may extract accurate interpretation of formation properties from a multi-frequency electromagnetic (EM) logging tool, e.g., a five-frequency EM logging tool.

In some aspects, the model may relate the effective permittivity of the volume to a function of the corresponding permittivity of each of a plurality of components of the volume as modified by an operator. This operator may comprise a root of degree $C_{EXP}$, where $C_{EXP}$ is a positive real rational number. A value for $C_{EXP}$ and one or more parameters of interest may be estimated, such as, for example, by performing an inversion using the measurements.

From the multi-frequency EM tool, permittivity and conductivity of bulk formation may be acquired via measurements of complex permittivity at several frequencies sufficient to solve for unknown parameters of the model. Measurements from the multi-frequency EM tool may serve as inputs to the model; then water or hydrocarbon content can be inverted more effectively and accurately for the sake of the proposed model. Porosity and borehole temperature may be measured from other logging devices. Prior information from lithology or volumetric analysis may optionally be used for matrix permittivity computation. In most cases, hydrocarbon permittivity may be considered a constant value over the entire frequency spectrum.

Aspects of the disclosure may estimate (e.g., via calculation) water resistivity, water saturation, and $C_{EXP}$ for the volume under investigation. As described above, the processing of the measurements (e.g., analysis, inversion) outputs water resistivity and water saturation of the formation at the same time. Further correlation may be used to convert these parameters to CEC and textural parameters. Based on inversion results, clay properties can be derived by searching through a predefined model database.

The complex permittivity of the earth formation may be estimated using a well logging system. Electromagnetic waves are energized in the formation using a transmitter antenna disposed in the borehole. The attenuation and phase difference between signals received by spaced receiver antennas disposed in the borehole may be used to estimate the complex permittivity, which may be used in conjunction with techniques described in greater detail below to estimate an electrical parameter of the volume, a textural parameter of the volume, and other parameters of interest of the formation such as water saturation.

Figure 1C:
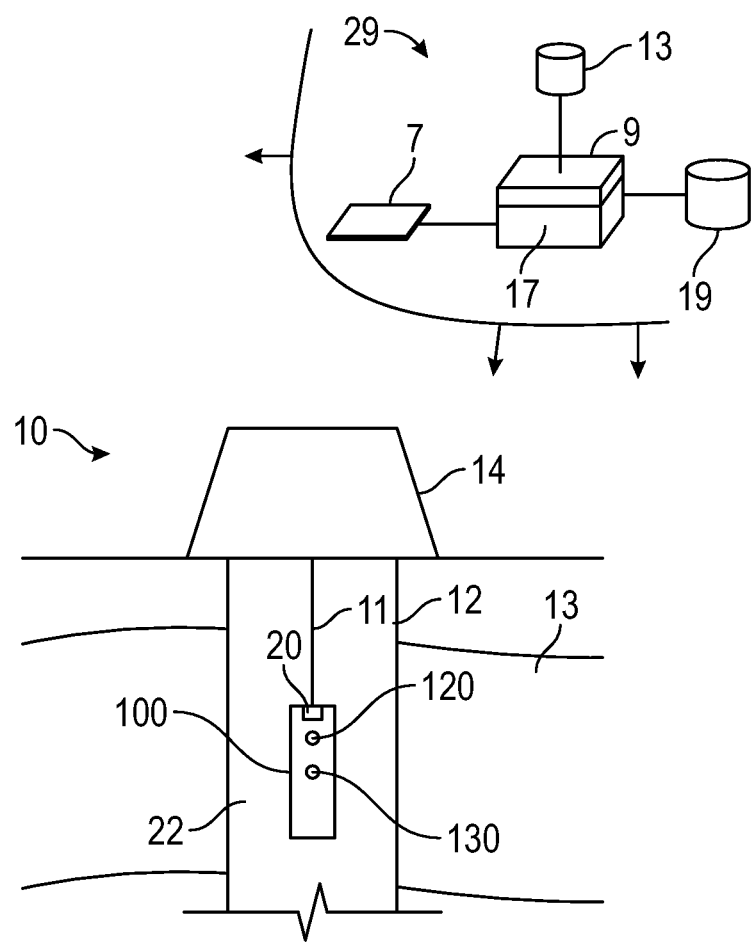
FIG. 1C shows an exemplary embodiment of a system for evaluation of an earth formation using measurements from a downhole electromagnetic tool.

FIG. 1C shows an exemplary embodiment of a system for evaluation of an earth formation using measurements from a downhole electromagnetic tool. The system 10 includes a carrier 11 that is shown disposed in a wellbore or borehole 12 that penetrates at least one earth formation 13 during a drilling operation and makes measurements of properties of the formation 13 and/or the borehole 12 downhole. As described herein, "borehole" or "wellbore" refers to a single hole that makes up all or part of a drilled well. Depending on the configuration, the system 10 may be used during drilling and/or after the wellbore 12 has been formed. While a land system is shown, the teachings of the present disclosure may also be utilized in offshore or subsea applications.

As described herein, "formations" refer to the various features and materials that may be encountered in a subsurface environment and surround the borehole. The term "information" includes, but is not limited to, raw data, processed data, and signals.

It should be understood that embodiments of the present disclosure are equally well suited for use in wells having various configurations including horizontal wells, deviated wells, slanted wells, multilateral wells and so on. Accordingly, use of directional terms herein (e.g., above, below, upper, lower, upward, downward, topmost, lowermost, uphole, downhole, etc.) refer to the direction of travel along the borehole either toward or away from the surface, with the upward direction being toward the surface and the downward direction being away from the surface.

In some embodiments, the system 10 includes a downhole wireline tool 100 suspended in a borehole 12 penetrating an earth formation 13 from a suitable carrier 11, such as a cable that passes over a sheave mounted on a derrick 14. The cable may include a stress member and a number of conductors (typically seven) for transmitting commands to the tool 100 from the surface, receiving data at the surface from the tool, and supplying power to the tool. The tool 100 may be raised and lowered by a draw works.

Downhole tool 100 may be coupled or combined with additional tools including some or all the hardware environment 29, described in further detail below. The hardware environment 29 may implement one or more control units configured to operate the tool 100 or other components of system 10, and/or conduct method embodiments disclosed below.

The hardware environment 29 may include at least one processor, implemented, for example, as a suitable computer. The hardware environment 29 may be located downhole, at the surface, and/or remotely and provide for performing data analysis in the field (including in real time), or alternatively, the recorded data may be sent to a remote processing center for post processing of the data. Also, the data may be partially processed in real time and partially at a processing center.

A surface control system 15 may receive signals from downhole sensors and other sensors used in the system 10 and processes such signals according to programmed instructions provided to the surface control system 15. The surface control system 15 may display desired parameters and other information on a display/monitor that is utilized by an operator. The surface control system 15 may further communicate with a downhole control system 20 at a suitable location on downhole tool 10. The surface control system 15 may process data relating to the operations and data from the sensors, and may control one or more downhole operations performed by system 100.

In one embodiment, electronics associated with sensors 120 and/or 130 may be configured to record and/or process the information obtained. Certain embodiments of the present disclosure may be implemented with a hardware environment 29 that includes an information processor 17, an information storage medium 13, an input device 7, processor memory 9, and may include peripheral information storage medium 19. The hardware environment may be in the well, at the rig, or at a remote location. Moreover, the several components of the hardware environment may be distributed among those locations. The input device 7 may be any data reader or user input device, such as data card reader, keyboard, USB port, etc. The information storage medium 13 stores information provided by the detectors. Information storage medium 13 may include any non-transitory computer-readable medium for standard computer information storage, such as a USB drive, memory stick, hard disk, removable RAM, EPROMs, EAROMs, flash memories and optical disks or other commonly used memory storage system known to one of ordinary skill in the art including Internet based storage. Information storage medium 13 stores a program that when executed causes information processor 17 to execute the disclosed method. Information storage medium 13 may also store the formation information provided by the user, or the formation information may be stored in a peripheral information storage medium 19, which may be any standard computer information storage device, such as a USB drive, memory stick, hard disk, removable RAM, or other commonly used memory storage system known to one of ordinary skill in the art including Internet based storage. Information processor 17 may be any form of computer or mathematical processing hardware, including Internet based hardware. When the program is loaded from information storage medium 13 into processor memory 9 (e.g. computer RAM), the program, when executed, causes information processor 17 to retrieve detector information from either information storage medium 13 or peripheral information storage medium 19 and process the information to estimate a parameter of interest. Information processor 17 may be located on the surface or downhole.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, an information processing device includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

In one embodiment, circuitry associated with the sensors may be configured to take measurements at a plurality of borehole depths as the tool moves along the longitudinal axis of the borehole. These measurements may be substantially continuous, which may be defined as being repeated at very small increments of depth, such that the resulting information has sufficient scope and resolution to provide an image of borehole parameters.

In other embodiments, the system 10 includes a conventional derrick 14 that may support a rotary table that is rotated at a desired rotational speed. The carrier 11 may include one or more drill pipe sections that extend downward into the borehole 12 from the rotary table, and is connected to a drilling assembly. Drilling fluid or drilling mud 22 is pumped through the drillstring 11 and/or the borehole 12. The well drilling system 10 may also include a bottomhole assembly (BHA). In one embodiment, a drill motor or mud motor is coupled to the drilling assembly and rotates the drilling assembly when the drilling fluid 22 is passed through the mud motor under pressure.

The system 10 includes any number of downhole tools 100 for various processes including formation drilling, geosteering, and formation evaluation (FE) for measuring versus depth and/or time one or more physical quantities in or around a borehole. The tool 100 may be included in or embodied as a BHA, drillstring component or other suitable carrier. "Carrier" as described herein means any device, device component, combination of devices, media and/or member that may be used to convey, house, support or otherwise facilitate the use of another device, device component, combination of devices, media and/or member. Exemplary non-limiting carriers include drill strings of the coiled tubing type, of the jointed pipe type and any combination or portion thereof. Other carriers include, but are not limited to, casing pipes, wirelines, wireline sondes, slickline sondes, drop shots, downhole subs, bottom-hole assemblies, and drill strings.

In one embodiment, one or more downhole components, such as the downhole tool 100, may include sensor devices 120 configured to make electrical measurements indicative of dielectric permittivity, as described in greater detail below. Other sensors 130 may be configured to measure various parameters of the formation and/or borehole, tool position and orientation, environmental conditions such as temperature and pressure, and so on. For example, one or more sensors 130 (or sensor assemblies such as MWD subs) are configured for formation evaluation measurements and/or other parameters of interest (referred to herein as "evaluation parameters") relating to the formation, borehole, geophysical characteristics, borehole fluids and boundary conditions. These sensors 130 may include sensors for measuring borehole parameters (e.g., borehole size, borehole inclination and azimuth, and borehole roughness), sensors for measuring geophysical parameters (e.g., acoustic velocity, acoustic travel time, electrical resistivity), sensors for measuring borehole fluid parameters (e.g., viscosity, density, clarity, rheology, pH level, and gas, oil and water contents), boundary condition sensors, and sensors for measuring physical and chemical properties of the borehole fluid.

A point of novelty of the system illustrated in FIG. 1 is that the control unit(s) may be configured to perform certain methods (discussed below) that are not in the prior art. A surface control unit and/or downhole control unit may be configured to control sensors described above and to estimate a parameter of interest according to methods described herein. Control of these components may be carried out using one or more models or algorithms using methods described below.

Mathematical models, look-up tables, or other models representing relationships between the signals and the values of the formation properties may be used to characterize operations in the formation or the formation itself, optimize one or more operational parameters of production or development, and so on. The system may carry out these actions through notifications, advice, and/or intelligent control.

Various types of electrical sensors 120 may be used in evaluating the formation in accordance with embodiments disclosed herein. As one example, sensors that are based on electromagnetic (EM) wave propagation are used for many applications where amplitude and phase of wave traveled in an unknown medium are studied to infer the properties of that medium. Although aspects of the disclosure may beneficially utilize (EM) wave propagation, particular embodiments may employ the techniques disclosed herein in connection with various types of induction logging, including multi-component induction logging. In some embodiments, the electromagnetic tool 10 may include at least one transmitting antenna and at least one receiving loop antenna mounted on a pad. Dielectric measurements may be obtained, for example, by measuring amplitude attenuation and phase difference from a compensated symmetric antenna system.

As described above, dielectric measurement and evaluation may include the estimation of electric permittivity of materials. Electric permittivity may include imaginary and real parts, which may vary with the frequency of an electrical signal exposed to a material. In some aspects, electric permittivity may be estimated using an electromagnetic tool configured to generate an electric current at a plurality of frequencies.

Figure 2A:
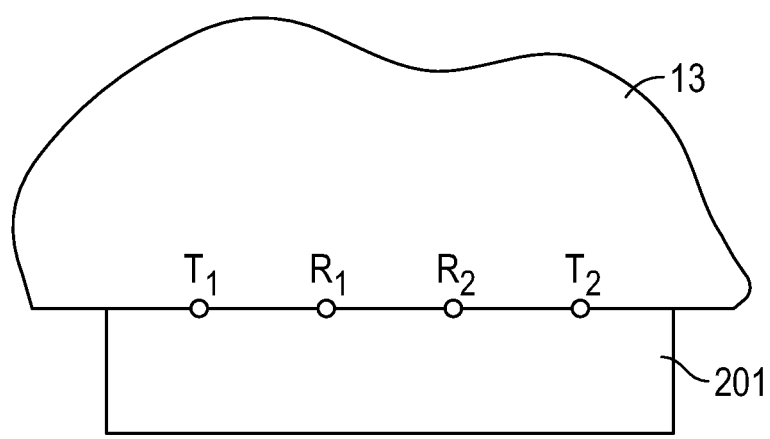
FIGS. 2A-2D illustrate dielectric measurement using a downhole logging tool.

FIG. 2A depicts a cross-sectional view of downhole tool 201 (e.g., electromagnetic tool, dielectric tool, or other logging tool, etc.) in a homogenous medium. The tool 201 may include transmitters T1, T2 and receivers R1, R2. The transmitters T1, T2 may be symmetrically arranged with the receivers R1, R2. That is, the distance from T1 to R1 may be equal to the distance from T2 to R2; and the distance from T1 to R2 may be equal to the distance from T2 to R1.

A conventional technique of measurement compensation involving two receivers positioned symmetrically with respect to two transmitters (as shown in FIG. 2A) is demonstrated. The relative phase shift between R1 and R2 when T1 is fired may be given by:

$$\theta_{R_1R_2}^{T1} = \theta_{R_2}^{T1} - \theta_{R_1}^{T1} \tag{15}$$

The relative phase shift between R1 and R2 when T2 is fired may be given by:

$$\theta_{R_1R_2}^{T2} = \theta_{R_1}^{T2} - \theta_{R_2}^{T2} \tag{16}$$

The compensated relative phase may be given by:

$$\theta_{R_1R_2} = 0.5(\theta_{R_1R_2}^{T1} + \theta_{R_1R_2}^{T2}) \tag{17}$$

where $\theta_{R_j}^{T_i}$ is the phase measured by receiver j when transmitter i is fired and can be written as $$\theta_{R_j}^{T_j} = \theta_{T_i} + \theta_{R_j} + \theta(r) \tag{18}$$

in which $\theta_{T_i}$ and $\theta_{R_j}$ are the phase shifts of transmitter i and receiver j with respect to a common source and $\theta(r)$ is the phase shift due to wave traveling in the probed medium between transmitter and receiver which are apart by a distance of r.

Equations (15) and (16) eliminate the effect of internal phase shift at T1 and T2. As it can be seen from plugging in Equation (18) in Equations (15) and (16) and using Equation (17) one can eliminate the effect of phase shift at R1 and R2. The assumption behind this method is that the wave traveling from either of the transmitters would experience the same phase shift in the probed medium which means that the medium in front of the transmitter and receiver should be homogenous or symmetrically positioned (with respect to transmitters and receivers) heterogeneous.

Figure 2B:
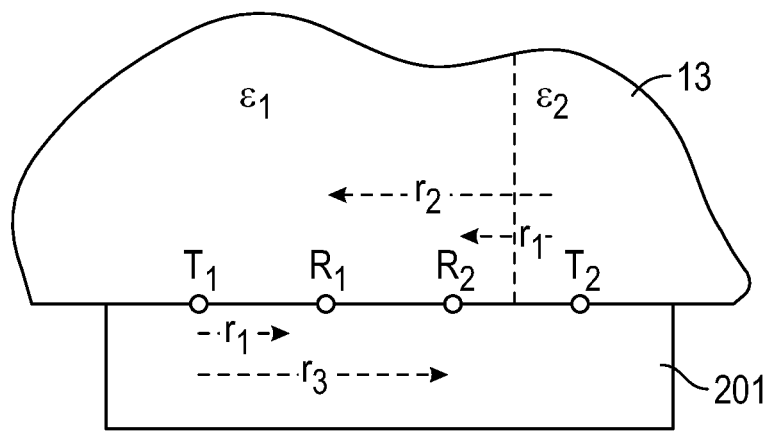

FIG. 2B depicts a cross-sectional view of tool 201 in heterogenous media having relative permittivities, $\varepsilon_1$ and $\varepsilon_2$. Generally, for an electromagnetic wave propagating in a near field regime, the phase difference between the wave passing through points in space is not only a function of the distance between the two points ($r_2-r_1$) but also a function of absolute position of those points ($r_1$ and $r_2$). Consider the medium of FIG. 2B, where the tool is positioned in a way that the interface between medium 1 and medium 2 is located between Transmitter 2 and the closest receiver (Receiver 2). Ignoring the effect of reflection at the interface, the effect of medium 2 can be replaced by an equivalent medium with the same properties as of medium 1, but with longer distance between Transmitter 2 and receivers (since $\varepsilon_2 > \varepsilon_1$).

Figure 2C:
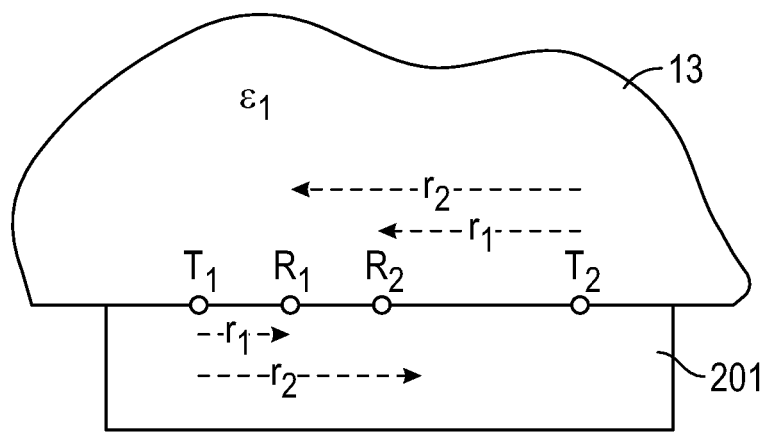

FIG. 2C shows the approximate effect of heterogeneous media on the propagation of an electromagnetic wave. Referring to FIGS. 2B-2C, although $r_2-r_1=r^*_2-r^*_1$, $r_2 \neq r^*_2$ and $r_1 \neq r^*_1$; thus, the "simulated" distances between transmitter and receivers from the left and right are not equal. This leads to an unequal phase shift for an electromagnetic wave travelling from these transmitters, which renders the traditional approach invalid.

Figure 2D:
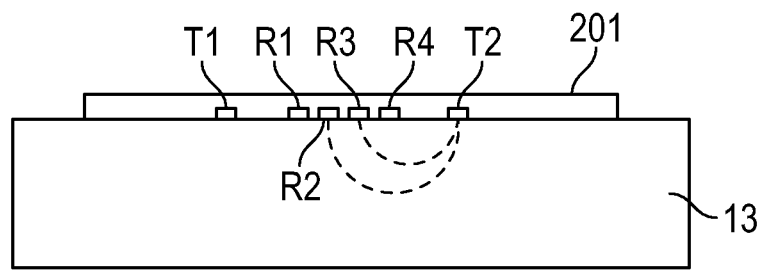

FIG. 2D shows the phase shifts of wave propagation tool 207 according to embodiments of the present disclosure. Tool 207 may include transmitters T1, T2 and receivers R1-R4. The transmitters T1, T2 may be symmetrically arranged with the receivers R1-R4. For example, the distance from T1 to R1 may be equal to the distance from T2 to R4; and the distance from T1 to R2 may be equal to the distance from T2 to R3.

Referring to FIG. 2D, to obtain the phase difference between receivers R2 and R3, the symmetrical transmitters are used to cancel the effect of phase shift on each receiver. Upon firing transmitter T1, the phase shifts at R2 and R3 may be expressed as:

$$\theta_{R_3}^{T1} = \theta_{T_1 R_3} - \theta_{R_3}^{sh} \tag{19}$$

$$\theta_{R_2}^{T1} = \theta_{T_1 R_2} - \theta_{R_2}^{sh} \tag{20}$$

where $\theta_{R_j}^{T_i}$ is the phase shift recorded at receiver j when transmitter i is fired, $\theta_{T R_j}$ is representative of the time the EM wave propagates in the formation, $\theta_{R_j}^{sh}$ is the internal value of the phase shift at receiver j. The relative phase shift between receivers R2 and R3 after firing transmitter T1 (i.e., $\theta_{R_2}^{T1} - \theta_{R_3}^{T1}$) may be expressed as:

$$\theta_{R_2 R_3}^{T1} = \theta_{T_1 R_2} + \theta_{R_2}^{sh} - \theta_{T_1 R_3} - \theta_{R_3}^{sh} \tag{21}$$

Upon firing transmitter T2, the phase shifts at R2 and R3 may be expressed as:

$$\theta_{R_3}^{T2} = \theta_{T_2 R_3} - \theta_{R_3}^{sh} \tag{22}$$

$$\theta_{R_2}^{T2} = \theta_{T_2 R_2} - \theta_{R_2}^{sh} \tag{23}$$

The relative phase shift between receivers R3 and R2 after firing transmitter T2 may be expressed as ($\theta_{R_3}^{T2} - \theta_{R_2 T_2}$):

$$\theta_{R_3 R_2}^{T2} = \theta_{T_2 R_3} + \theta_{R_3}^{sh} - \theta_{T_2 R_2} - \theta_{R_2}^{sh} \tag{24}$$

Conventionally, it may be assumed that these phase shifts are equal:

$$\theta_{T_2 R_2} = \theta_{T_1 R_3}, \theta_{T_2 R_3} = \theta_{T_1 R_2} \tag{25}$$

After substituting $\theta_{T_1 R_2}$ and $\theta_{T_1 R_3}$ into Eq. (24), the relative phase shift between receivers R3 and R2 after firing transmitter T2 (i.e., $\theta_{R_3}^{T2} - \theta_{R_2}^{T2}$) may be given by:

$$\theta_{R_3 R_2}^{T2} = \theta_{T_1 R_2} + \theta_{R_3}^{sh} - \theta_{T_1 R_3} - \theta_{R_2}^{sh} \tag{26}$$

Thus, a compensated measurement for the relative phase between receivers R3 and R2 may be given as:

$$\theta_{R_2 R_3}^{com} = \frac{(\theta_{R_2 R_3}^{T_1} + \theta_{R_3 R_2}^{T_2})}{2} \tag{27}$$

$$\theta_{R_2 R_3}^{com} = \theta_{T_1 R_2} - \theta_{T_1 R_3} \tag{28}$$

Techniques in accordance with embodiment of the present disclosure as described herein may be employed in connection with a variety of downhole tools conveyed on various carriers. Several general examples are described hereinbelow.

Figure 3A:
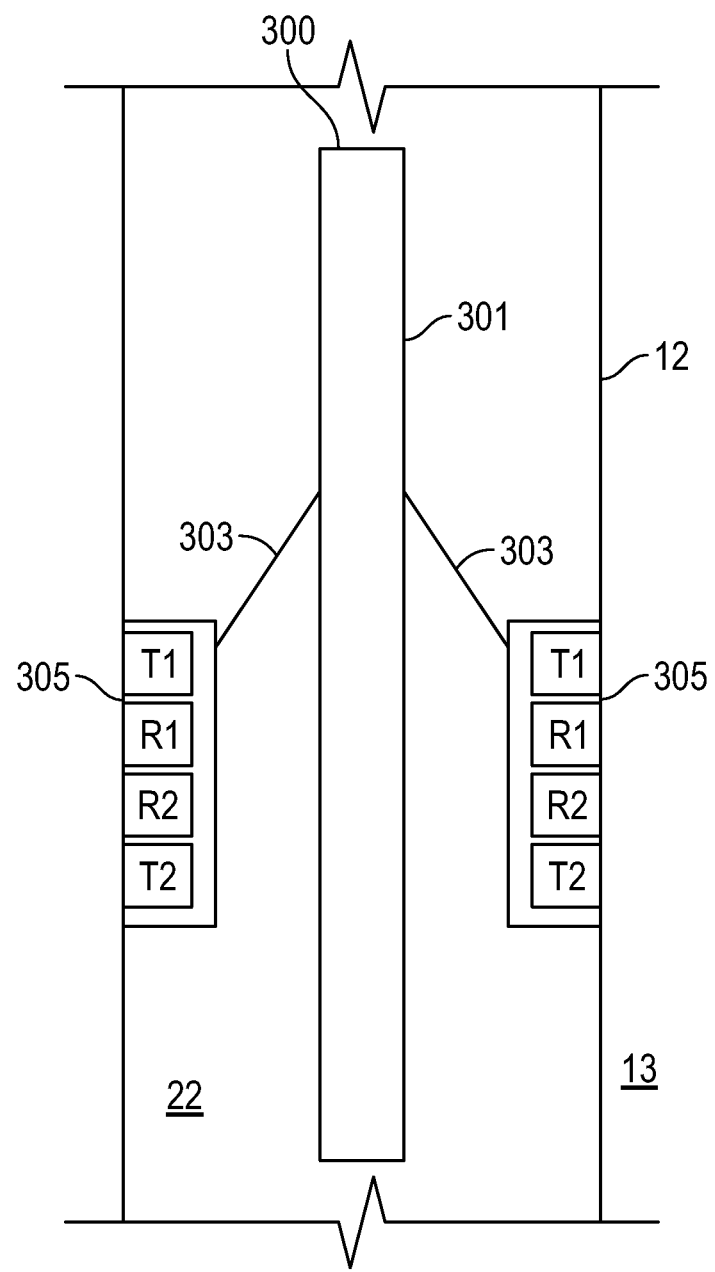
FIGS. 3A-3C illustrate downhole logging tools for evaluating an earth formation in accordance with embodiments of the present disclosure.

FIG. 3A shows downhole logging tool (downhole tool, logging tool, multi-frequency dielectric array logging tool, electromagnetic tool, dielectric tool, or tool) 300 for evaluating an earth formation according to embodiments of the present disclosure. The dielectric tool 300 may be disposed on carrier 11 (not shown) intersecting the earth formation 13. The dielectric tool 300 may include a body (e.g., BHA, housing, enclosure, drill string, wireline tool body) 301 having pads 305 extended on extension devices 303. Two pads are shown for illustrative purposes and, in actual practice, there may be more or fewer pads, such as three pads separated by about 120 degrees circumferentially or six pads separated by about 60 degrees. The extension devices 305 may be electrically operated, electromechanically operated, mechanically operated or hydraulically operated. With the extension devices 303 fully extended, the pads (dielectric tool pads) 305 may engage the borehole 12 and make measurements indicative of at least one parameter of interest of the volume under investigation, such as water saturation, water conductivity, water permittivity, permittivity of dry rock, permittivity of hydrocarbons, textural parameters of the formation (e.g., grain shape), cation exchange capacity ('CEC'), and total porosity.

Pads 305 may include a face configured to engage the borehole 12. The term "engage," as used herein, may be defined as in contact with the borehole 12, urged against the borehole 12, pressed firmly against the borehole 12, or positioned proximate the borehole 12. The term "proximate," as used herein, may be defined as the pad being near the borehole 12 such that measurements may be taken from the pad that are useful in evaluating the borehole, earth formation, or both. The term "face" refers to the surface, edge, or side of the tool body or pad that is closest to the borehole wall.

Pads 305 may include transmitter T1, T2 and receivers R1, R2. The transmitters may be configured to radiate EM waves into the formation; and the receivers may be configured to be responsive to the EM waves radiating in the formation and generate a signal that is indicative of the parameter of interest. A processor may be configured to estimate the amplitude attenuation and phase difference between the transmitted signal and the received signals, which are used to estimate the parameter of interest. As an example, the attenuation and phase difference may be estimated between the received signals from at least two spaced receivers. This processing may be done downhole or at the surface, by using one or more processors hardware environment 29.

Figure 3B:
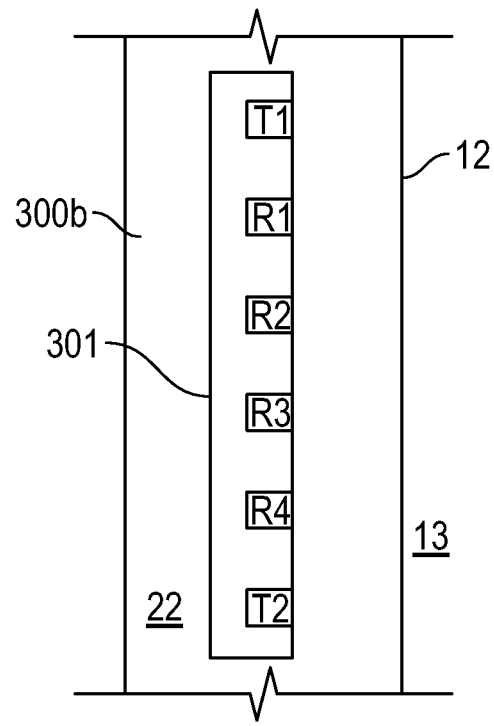

FIG. 3B shows a cross-sectional view of multi-frequency dielectric logging tool 300b in accordance with embodiments of the present disclosure. Dielectric tool 300b may include tool body 301 having transmitters T1, T2 and receivers R1-R4 disposed on tool body 301. In other embodiments, the transmitter-receiver configuration of logging tool 300b may be included on pads 305.

Figure 3C:
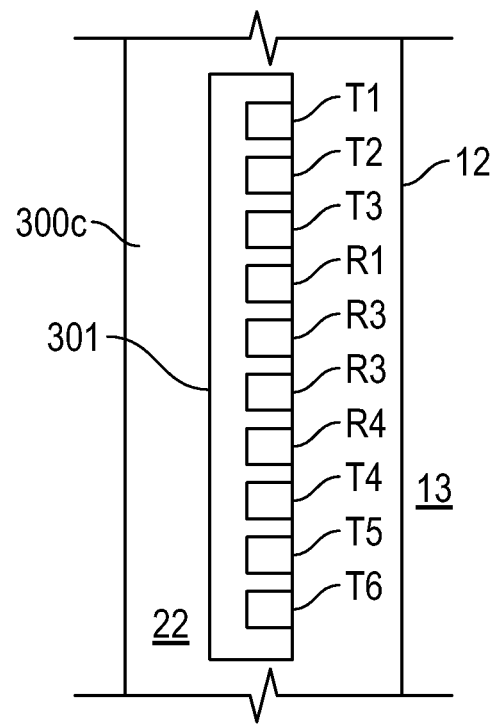

FIG. 3C shows a cross-sectional view of multi-frequency dielectric logging tool in accordance with embodiments of the present disclosure. Dielectric tool 300c may include tool body 301 having transmitters T1-T6 and receivers R1-R4 disposed on tool body 301. In other embodiments, the transmitter-receiver configuration of logging tool 300c may be included on pads 305.

Referring to FIGS. 3A-3C, the transmitters may be positioned symmetrically on pads 305 or tool body 301 with respect to the receivers on dielectric tools 300, 300b, and 300c. For example, on dielectric tool 300b, the distance from T1 to R3 may be the same distance as from T2 to R2; and the distance from T1 to R1 may be the same distance as from T2 to R4. In addition, each receiver may have a spacing from its adjacent receiver such that an EM wave propagating between those receivers travels at most one half wavelength (i.e., the propagation of EM waves between each adjacent receiver has a phase shift that is no greater than π radians or 180° due to the formation and not taking into account internal phase shifts of the tool circuitry). Also, the spacing between R1 and R2 may not exceed one half wavelength of the EM wave propagating in formation 13. The spacing between adjacent receivers may depend on the frequency range of the dielectric tool.

As non-limiting examples, each transmitter or receiver of the multi-frequency dielectric array logging tool may be configured as a loop antenna, a coil antenna, a monopole antenna, a dipole antenna, an antenna array, a patch antenna, a reflector antenna, a log-periodic antenna, etc. Each transmitter or receiver may be configured to operate at a plurality of frequencies.

The tool may use only a few frequencies. As an example, each transmitter or receiver may be configured to operate at a frequency range from about 10 MHz to about 1 GHz. For example, the tool may be tuned to only a few (e.g., five) discrete frequencies. Thus, each transmitter or receiver may be configured to have a bandwidth of about 1 GHz and tuned to a plurality of frequencies within that frequency band, and each tuned frequency within that band may be separated by at least 50 MHz.

Using complex measurements of the effective dielectric at multiple frequencies, the equations of the mixing model may be fit to the dispersion curve to obtain values for parameters of interest. In some embodiments, a mixing model may have a large number of unknown parameters, and thus more equations (and hence more measurements at more frequencies) may be utilized. Using the determined parameters for the selected mixing model and a given value of total porosity (obtained, for example, from previous measurements), the system of equations may be solved for parameter values. In cases where a solution is overdetermined, a least squares fitting algorithm may be used to estimate the parameters.

Techniques of the Present Disclosure

General embodiments of the present disclosure include methods for evaluating an earth formation comprising a fluid-saturated porous rock matrix including clay particles by using complex dielectric measurements. The complex dielectric measurements are modeled using a mixing model approximating the dielectric behavior of the formation by taking into account both the textural properties of clay minerals, such as shape and size of particles, and the effect due to conductive surfaces of clay by incorporating into the model several of the parameters of interest described above. As dielectric dispersive behavior of the volume is sensitive to these parameters, measuring the dielectric behavior of the formation at multiple frequencies provides a means to quantify these parameters.

Here we use the petrophysical definition of clay. More specifically, clay minerals are hydrous aluminum silicates, with variable amounts of iron, magnesium, alkali metals, alkaline earths, and other cations, including, for example, clays of the kaolin group, which includes the minerals kaolinite, dickite, halloysite and nacrite; clays of the smectite group, which includes dioctahedral smectites such as montmorillonite and nontronite, and trioctahedral smectites (e.g., saponite); clays of the illite group, which includes clay-micas; clays of the chlorite group, which includes a wide variety of similar minerals with considerable chemical variation; and so on.

Because CRIM addresses sandstones saturated (or partially saturated) with water and oil, both matrix grains are treated as averaged medium. In practice, however, as frequency decreases, the imaginary part of complex permittivities becomes more pronounced, as shown by Equation 3. Moreover, the effects from water conductivity are intertwined with matrix texture and mineralogy, making dispersion behavior more complex due, in part, to interaction of clays and brine in pore spaces.

In general embodiments, models in accordance with embodiments of the present disclosure may be expressed using the equation $$\sqrt[C_{EXP}]{\varepsilon^*_{Formation}} = (1-\Phi)\sqrt[C_{EXP}]{\varepsilon^*_{Matrix}} + S_W\Phi\sqrt[C_{EXP}]{\varepsilon^*_{Water}} + (1-S_W)\sqrt[C_{EXP}]{\varepsilon_{Oil}}, \qquad (29)$$

where $C_{EXP}$ is a general exponent. That is, $C_{EXP}$ is the degree of the root of each component's (phase's) permittivity, and may be a positive rational number.

Complex water permittivity is the dominant cause of formation dispersion. Effects of water come in two parts: first, the high dielectric constant of water increases permittivity of the entire mixture; in contrast, water salinity introduces a lossy term which has an impact on dielectric frequency spectrum. In general, larger water content leads to higher relative formation permittivity, and more conductive water denotes a steeper dispersive spectrum.

Figure 4A:
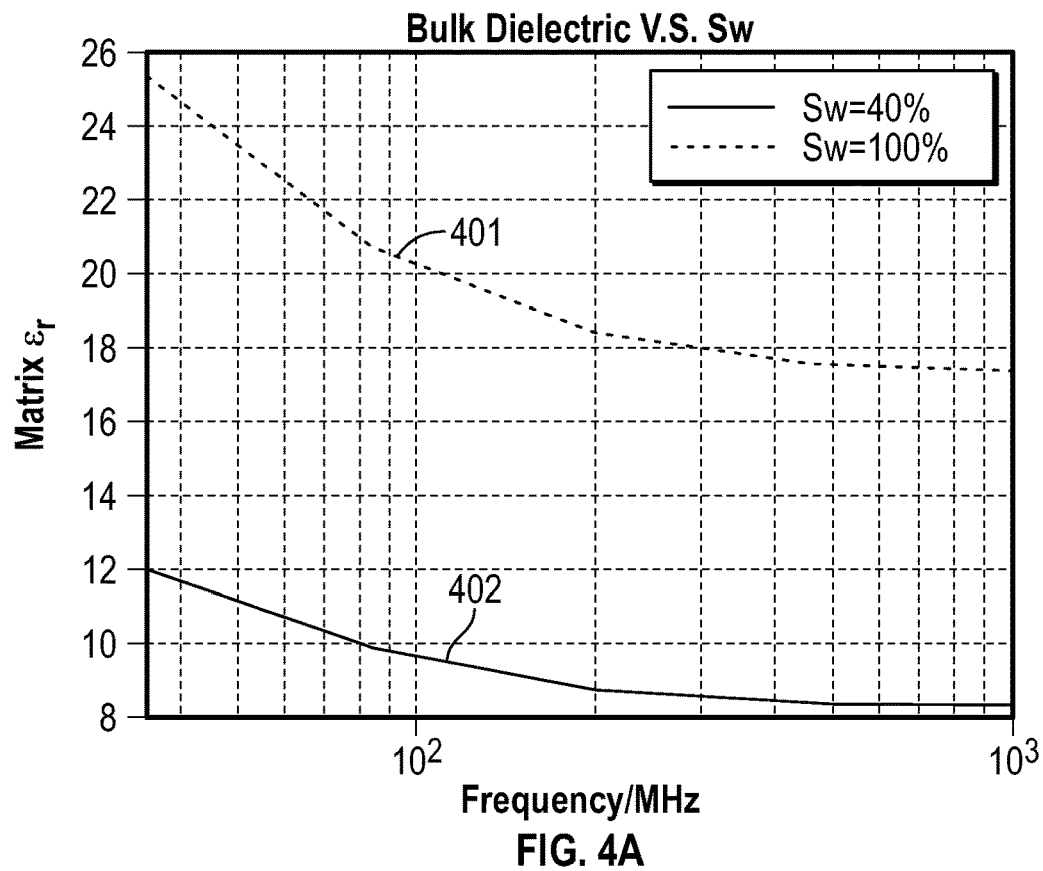
FIGS. 4A-4D illustrate the effect of parameters of interest of the volume on bulk dielectric measurements of the volume of the formation with respect to frequency.

FIGS. 4A-4D illustrate the effect of parameters of interest of the volume on bulk dielectric measurements of the volume of the formation with respect to frequency. The volume comprises a bulk mixture of rock, water and oil. FIG. 4A shows curves 401 and 402 illustrating a relationship of effective ("measured") permittivity of a volume of the formation with respect to frequency for particular values of water saturation. Rock relative permittivity is 5, porosity of the rock is 30 percent, resistivity of innate water is 1 Ohmm and $C_{EXP}$ is set as 2 in the described model. Curve 401 corresponds to measurements of a formation having a water saturation of 100 percent for a given volume. Curve 402 corresponds to measurements of a formation having a water saturation of 40 percent for the volume. With the existence of more water (which is conductive), separation of formation permittivity over the frequency range is enhanced.

Figure 4B:
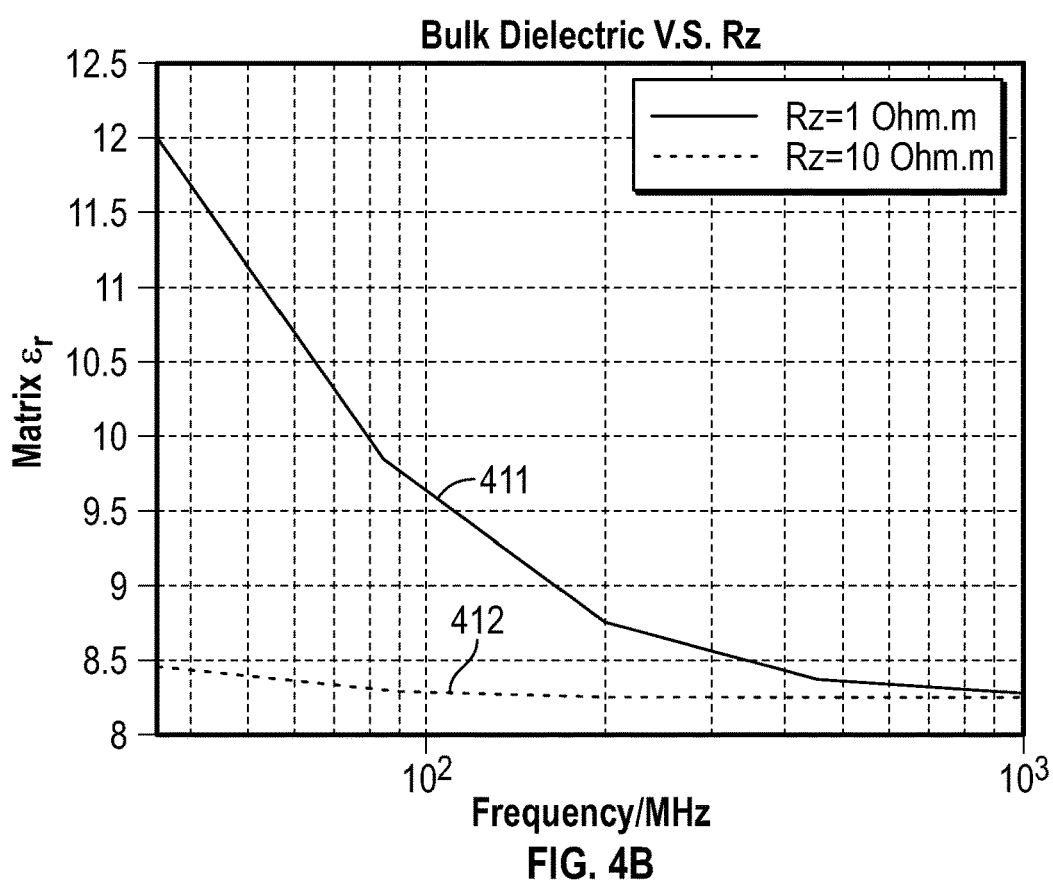

FIG. 4B illustrates the effect of formation water resistivity on effective ("measured") permittivity of a volume of the formation with respect to frequency. Rock relative permittivity is 5, porosity of the rock is 30 percent, water saturation is 40 percent, and $C_{EXP}$ is set as 2 in the described model. FIG. 4B shows curves 411 and 412 illustrating a relationship of effective ("measured") permittivity of a volume of the formation with respect to frequency for particular values of formation water resistivity. Curve 412 corresponds to measurements of a formation having a formation water resistivity of 10 Ohmm for a given volume. Curve 411 corresponds to measurements of a formation having a formation water resistivity of 1 Ohmm for the volume. Curve 411 corresponds to the more conductive volume, and thus results in a more pronounced permittivity dispersion than the more resistive volume indicated by curve 412.

Figure 4C:
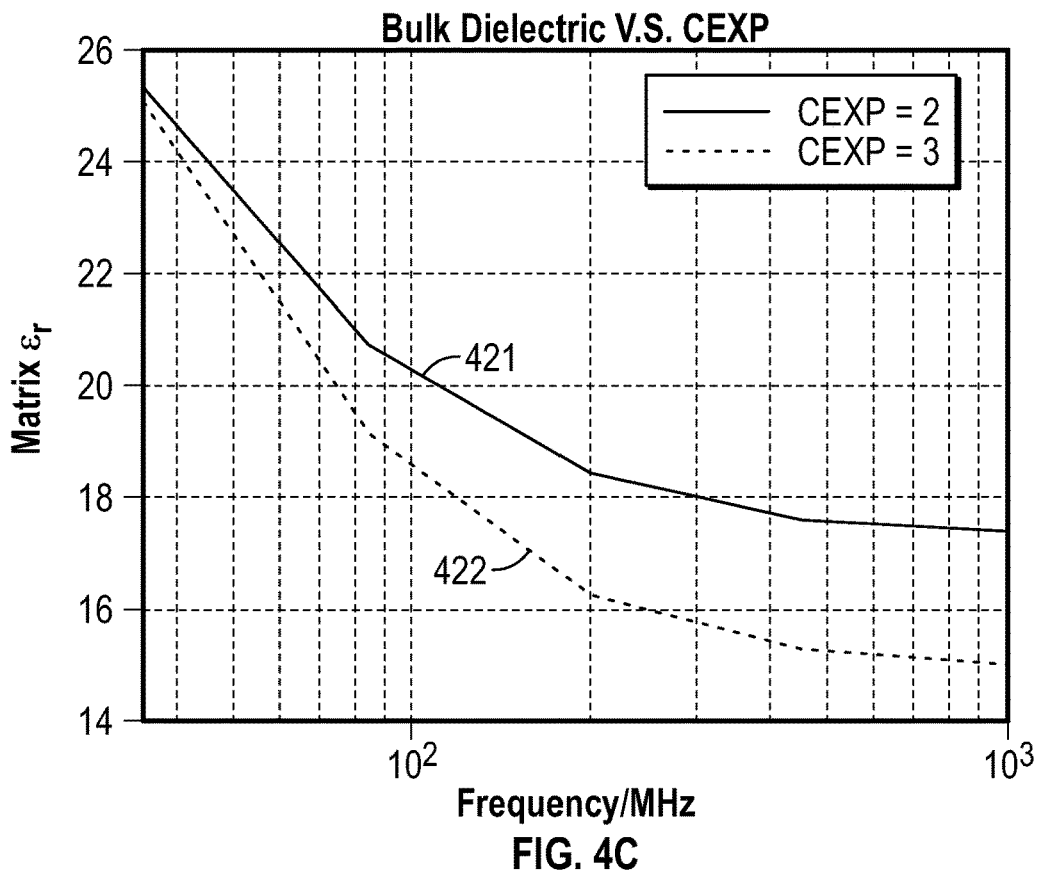

FIG. 4C illustrates the effect of $C_{EXP}$ on effective ("measured") permittivity of a volume of the formation with respect to frequency. By introducing the general exponent $C_{EXP}$, the model extends its flexibility enormously to specify the dispersive permittivity in a shaley formation. The general exponent, together with water saturation and water resistivity, is a deterministic factor to dielectric dispersion. Rock relative permittivity is 5, porosity of the rock is 30 percent, water saturation is 100 percent, and resistivity innate water is 1 Ohmm in the described model.

FIG. 4C shows curves 421 and 422 illustrating a relationship of effective ("measured") permittivity of a volume of the formation with respect to frequency for particular values of $C_{EXP}$. Curve 422 corresponds to measurements of a formation having a $C_{EXP}$ value of 2 for a given volume. Curve 421 corresponds to measurements of a formation having a $C_{EXP}$ value of 3 for the volume. It is apparent that curve 421 corresponding to a $C_{EXP}$ value of 3 shows more dominant enhancement at low frequencies than curve 422 corresponding to a $C_{EXP}$ value of 2 with respect to given model.

Figure 4D:
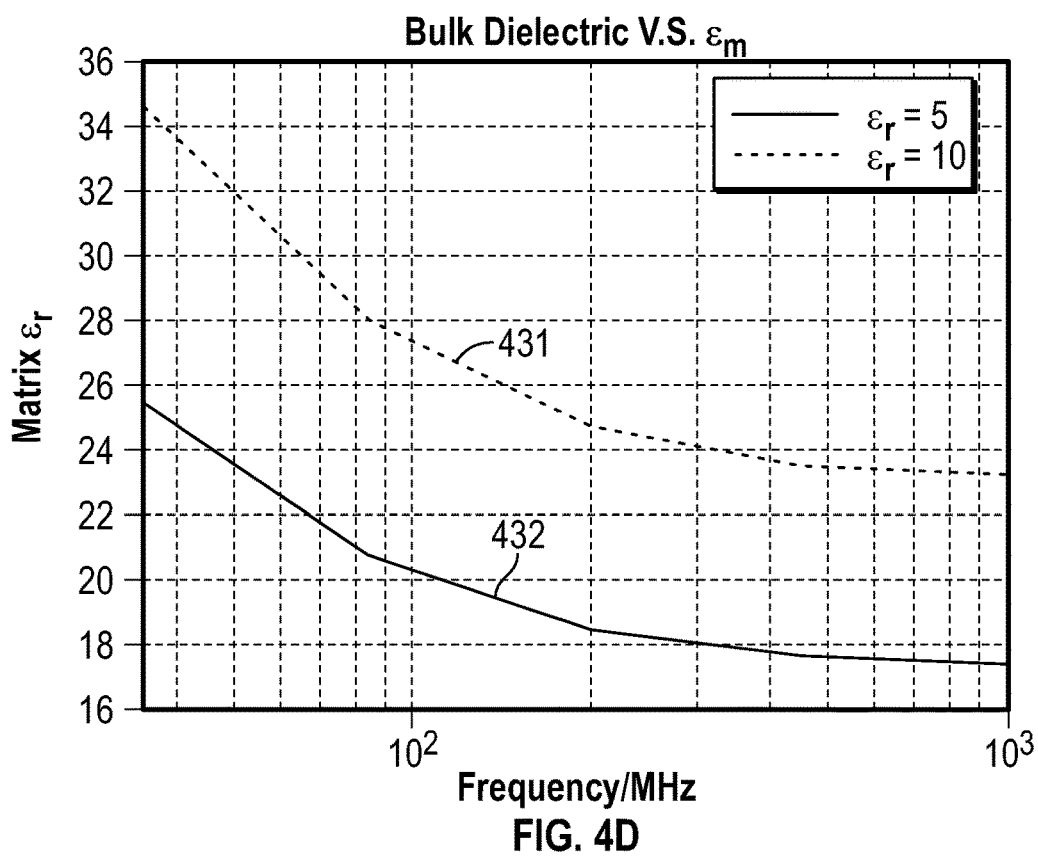

FIG. 4D illustrates the effect of rock permittivity on effective ("measured") permittivity of a volume of the formation with respect to frequency. Porosity of the rock is 30 percent, water saturation is 100 percent, resistivity innate water is 1 Ohmm and $C_{EXP}$ is set as 2 in the described model. FIG. 4D shows curves 431 and 432 illustrating a relationship of effective ("measured") permittivity of a volume of the formation with respect to frequency for particular values of formation rock permittivity. Curve 432 corresponds to measurements of a formation having a rock permittivity of 10 for a given volume. Curve 431 corresponds to measurements of a formation having a rock permittivity of 5 for the volume. Curve 431 results in a more pronounced permittivity dispersion than the model volume indicated by curve 432.

Aspects of the present disclosure include methods of finding clay type of shale content in the formation using a multi-frequency dielectric logging tool. A model may be used to identify the frequency dispersive behavior of formation dielectric constants. The comprehensive petro-physical model can accurately describe the relationship between measured formation electrical properties at different frequencies and matrix components and fluids in pores. This model depicts the effects caused by clay contents, which lie in matrix permittivity, formation water resistivity, and exponent of the mixing model. Inversion results based on the model are predictive of clay type, CEC and formation textures, which may be identified efficiently and without tedious and expensive core testing.

Measurements from a multi-frequency array dielectric tool as described above are used in techniques in accordance with embodiments of the present disclosure, described herein below. Based on the improved model, a least square minimization method may be applied to invert for unknowns in Eq. (29). Porosity may be obtained from other logging tools and permittivity of hydrocarbon may be a constant known value. Without prior information of porosity, the inversion may estimate a total porosity from the highest frequency measurement assuming salinity independence.

Figure 5:
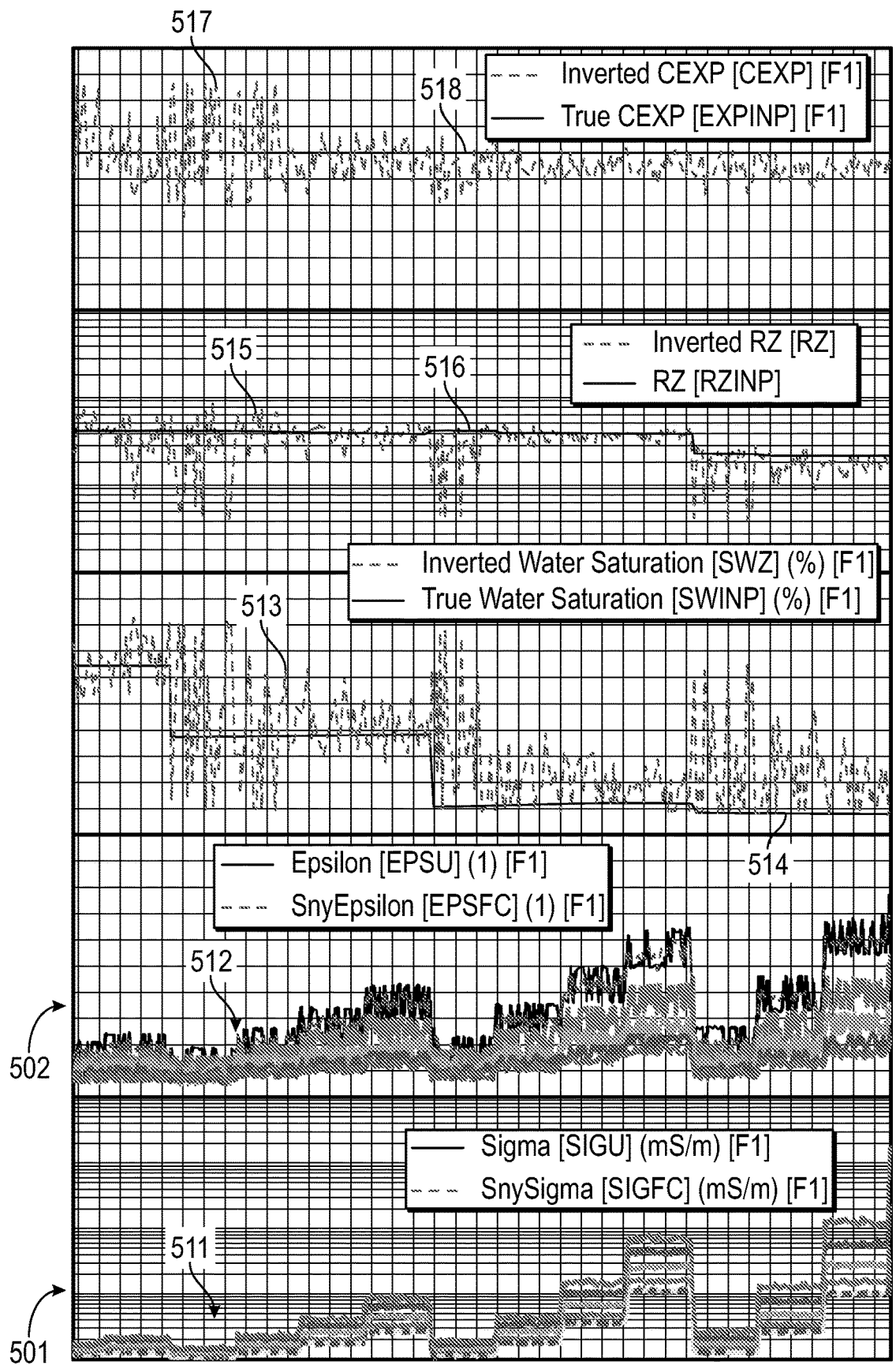
FIG. 5 shows synthetic modeling and inversion results illustrating the effect of parameters of interest on measurements.

FIGS. 1A & 1B illustrate the physical differences between sand and clay particles. FIG. 1C shows an exemplary embodiment of a system for evaluation of an earth formation using measurements from a downhole electromagnetic tool. FIGS. 2A-2D illustrate dielectric measurement using a downhole logging tool. FIGS. 3A-3C illustrate downhole logging tools for evaluating an earth formation in accordance with embodiments of the present disclosure. FIGS. 4A-4D illustrate the effect of parameters of interest of the volume on bulk dielectric measurements of the volume of the formation with respect to frequency. FIG. 5 shows synthetic modeling and inversion results illustrating the effect of parameters of interest on measurements. Track 501 includes a matrix conductivity curves 511 and track 502 comprises permittivity curves 512 corresponding to the measurements for each of five frequencies. SWZ curve 513 and SWINP curve 514 represent inverted and true (simulated) water saturation, respectively. Rz curve 515 and RZINP curve 516 represent inverted and model water resistivity, respectively. $C_{EXP}$ curve 517 and EXPINP curve 518 denote general exponents from inversion and from the simulation, respectively. Track 501 indicates conductivity with respect to depth. Track 502 indicates volume permittivity with respect to depth. With certain artificial noise added to simulated measurements, the inversion method adopted in this approach computes all the unknowns within acceptable error tolerances. The feasibility of inverting for water saturation, water resistivity, general exponent and matrix permittivity simultaneously is apparent.

Using complex measurements of the effective dielectric at multiple frequencies, the equations of the mixing model may be fit to the dispersion curve to obtain values for $\varepsilon_m$, and $S_W$. For example, the multi-frequency dispersion data may be inverted, correcting for environmental pressure (p) and temperature (T). From the Klein-Swift model, it is known that $\varepsilon_w = \varepsilon_w(\omega, S, T)$, wherein $\omega$ is frequency, S is salinity of water, and T is temperature. At least three equations may be applied to the three unknowns. However, because five complex equations may be considered as ten separate equations, the problem is overdefined, and a least square fit may be determined. In more detailed mixing models the number of unknown parameters increase, and thus more equations (and hence more measurements at more frequencies) are needed.

Measurements from the multi-frequency EM tool may be input to the model, then water or hydrocarbon content can be inverted more effectively and accurately using the techniques described herein. Based on inversion results, clay properties may then be derived by searching through a predefined model database.

Experimental results from field logs demonstrate that the model described above is able to produce excellent results for both permittivity and conductivity dispersion from a multi-frequency EM logging tool. Large dielectric dispersion is observed in shaley formation, and the parameters in Equation (29) are strongly related to clay properties. Assuming the rock matrix consists of clay and quartz, $C_{EXP}$, $\varepsilon_m$, and $\sigma_w$ are functions of volumetric clay content (Vsh), CEC, and salinity of water (Cw), as summarized below.

$$C_{EXP} = G(Vsh, CEC)$$

$$\varepsilon_{Matrix} = H(Vsh, CEC)$$

$$Rz = K(Vsh, CEC, Cw)$$

$C_{EXP}$ is predominantly indicative of textural effects due to lithology compositions. Quartz has a sphere-like grain shape, while other rock types (e.g., clays) consist of irregular shaped particles. Generally, $C_{EXP}$ increases with shale content and CEC.

Matrix permittivity may be correlated with clay content, although wet clays demonstrate significantly differences in parameter values than dry clays. This may be due to the double layer effect and/or conductive clay surface. Thus, matrix permittivity of a preliminary mixture may be reflective of lithological compositions of the volume, as influenced by shale volume and its CEC.

Rz is an interwined manifest from liberated ion movements in both free water and clay bounded water for shaly formation. Rz is a parameter that describes electrical resistance of the formation with a mixture of fluids in the pore space. Rz is influenced by free ion moments. On the other hand, surface of clay molecular sheet usually contains unbalanced negative charge, which will contribute to total conductivity as well. Salinity of free water and CEC of clay both play a critical role to the value of Rz. That is, Rz is highly dependent upon free water and CEC of clay.

A complete model may be generated from stochastic correlation from field logs, with lithology information provided by other tools, and CEC from core analysis, in order to establish a library (e.g., set up as a database) of relationships between the parameters. For example, CEC or shale content may be found using the other parameters as input to a lookup table.

Figure 6A:
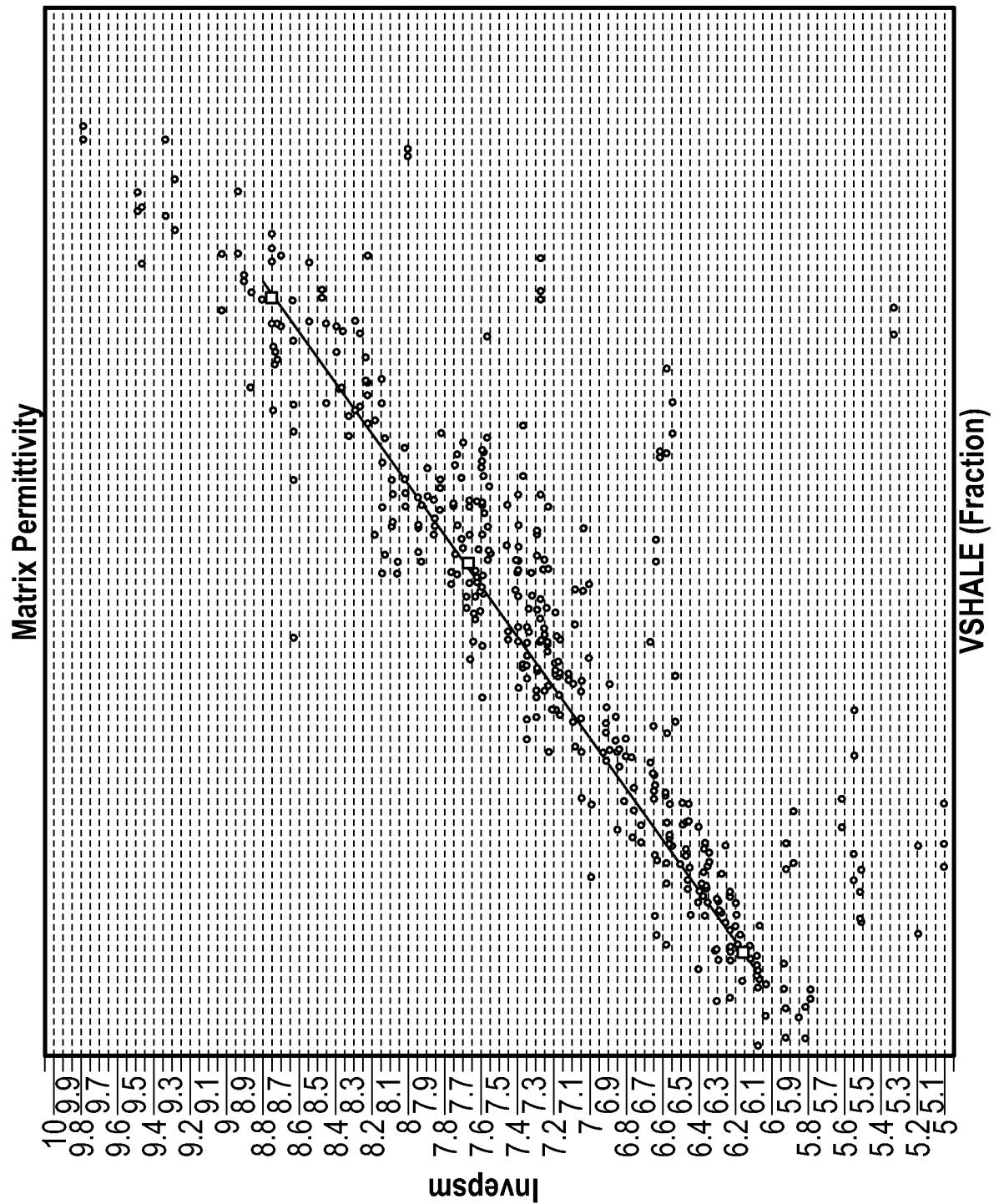
FIGS. 6A-6C illustrate the relationships of matrix parameters with other parameters of interest.
Figure 6B:
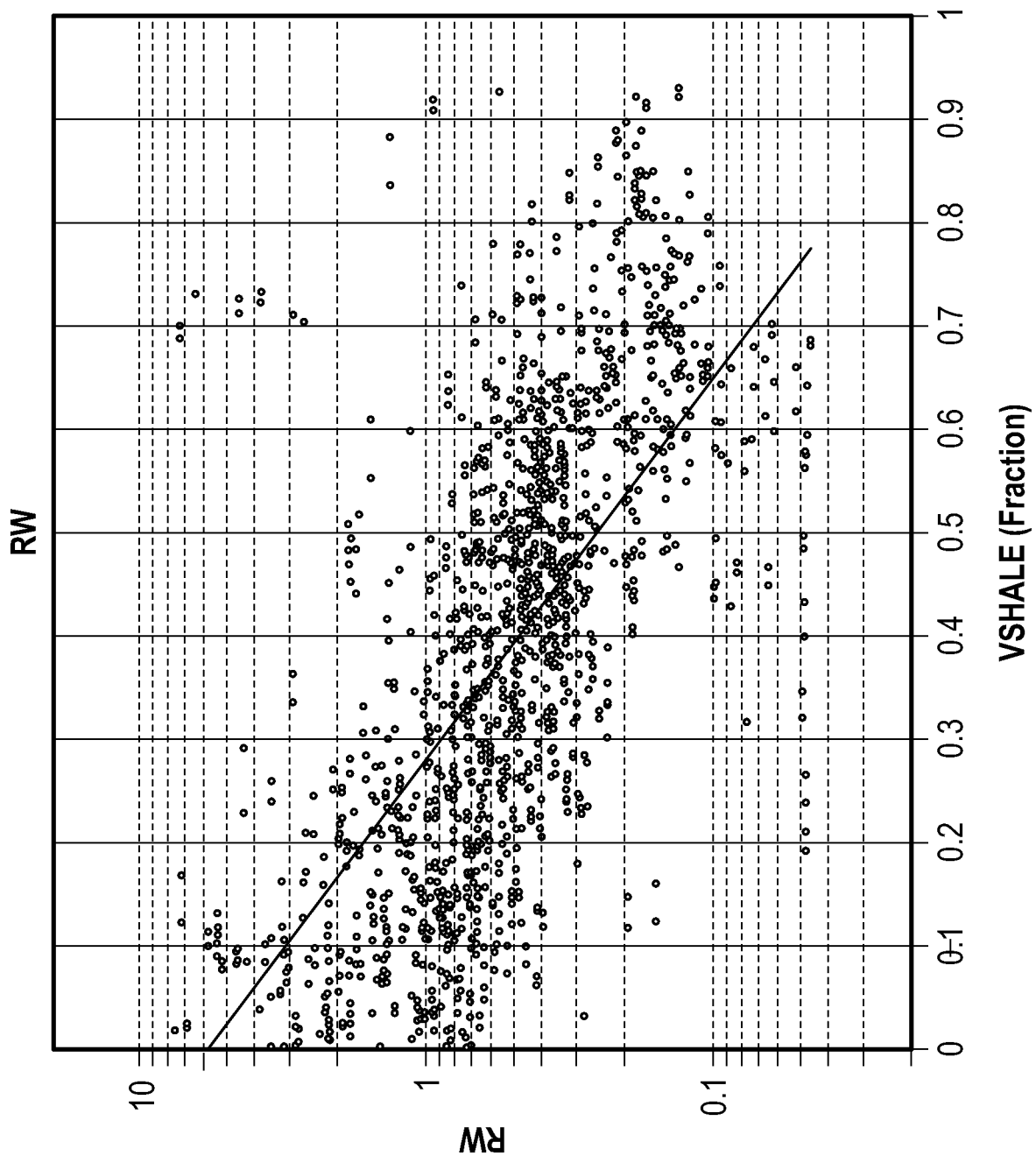
Figure 6C:
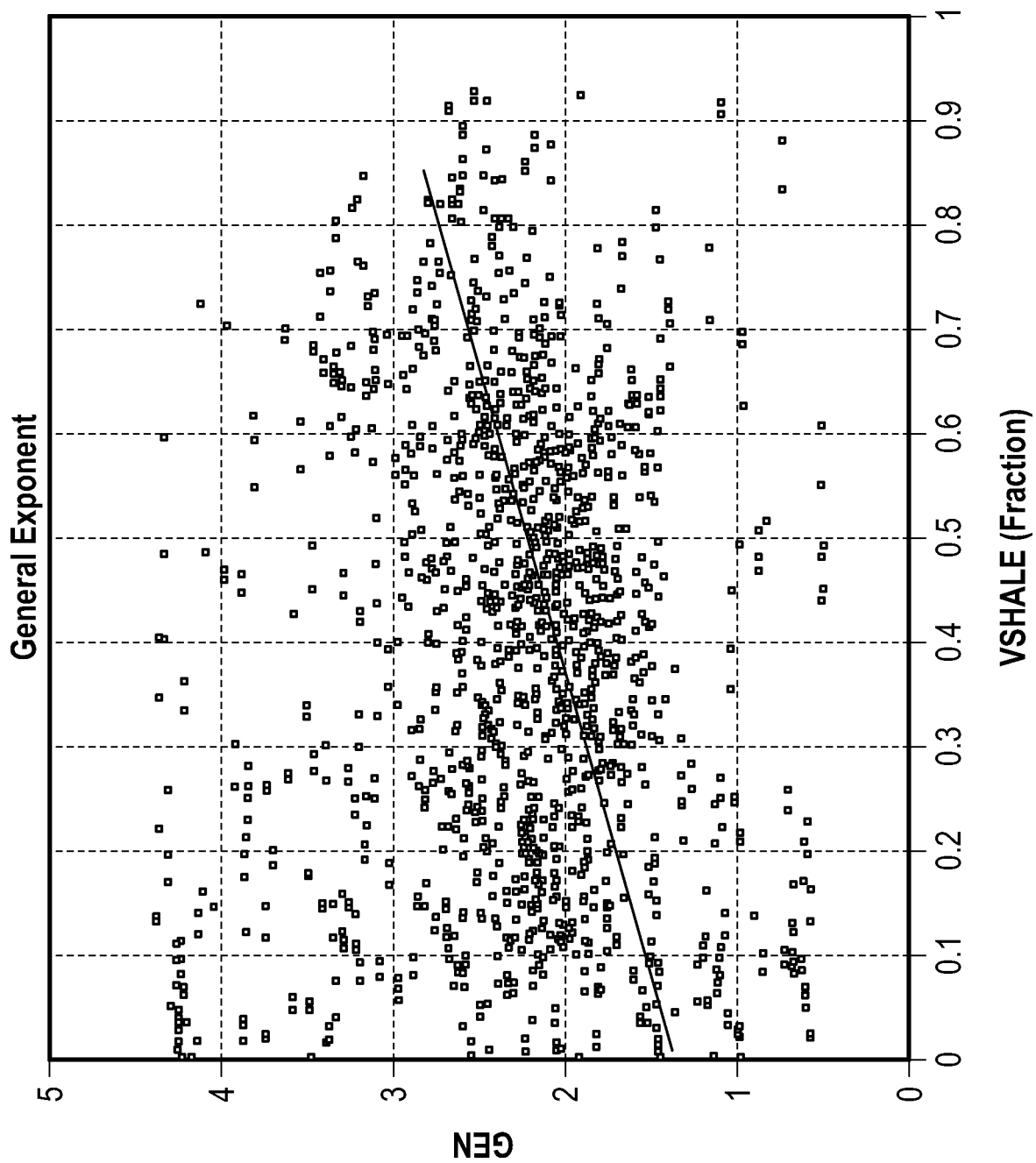

FIGS. 6A-6C illustrate the relationships of matrix parameters with other parameters of interest. FIG. 6A shows inverted matrix permittivity values as correlated with shale volume for shaly sand, which has high CEC and shale volume. FIG. 6B shows resistivity of formation water as correlated with shale volume. FIG. 6C shows general exponent value $C_{EXP}$ as correlated with shale volume.

Figure 7:
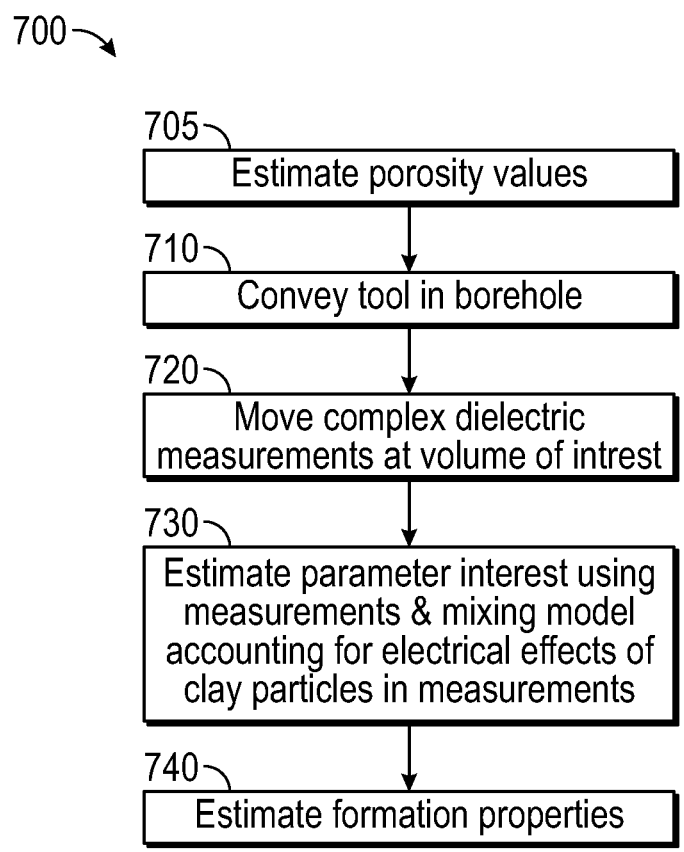
FIG. 7 illustrates a method for evaluating an earth formation using complex dielectric measurements.

FIG. 7 illustrates a method for evaluating an earth formation using complex dielectric measurements. The complex dielectric measurements may be modeled using a selected mixing model approximating the dielectric behavior of the formation, as described above. At optional step 705, the method may begin by estimating porosity values of a volume of interest in a borehole proximate the volume of interest of an earth formation. At optional step 710, the method may include conveying an electromagnetic tool in a borehole proximate a volume of interest of an earth formation. Conveying the tool may include tripping the tool on a wireline, conveying the tool on a drillstring by rotating a drillbit on a bottom hole assembly (BHA) at the distal end of the drill string to extend the borehole, and so on. At optional step 720, the method may include making complex dielectric measurements of the volume of interest in the borehole. Step 720 may be carried out by exciting one or more transmitters in the borehole at a plurality of frequencies to transmit signals into the volume, receiving signals at a plurality of receivers responsive to the excitation, and processing the signals to generate measurements. Steps 710 and 720 may be carried out by using at least one processor to direct the carrier or other drilling or borehole equipment, or control the transmitters, either directly, or by using commands to intermediate processors (e.g., controllers, DSPs, and the like) in operative connection with measurement circuitry including signal generators, amplifiers, power sources, data storage, etc. to generate and measure electromagnetic phenomena (e.g., a propagating wave).

Making measurements may include estimating a phase shift associated with one or more signals. An inversion may be carried out by inverting for permittivity and conductivity using a wholespace model as an initial guess. In the whole space inversion, first the synthetic tool response in an isotropic whole-space model, i.e., without horizontal or vertical boundaries, is calculated. The synthetic whole-space response is then compared with measured field data at each logging depth and the respective parameter values are adjusted to match the synthetic responses with the measured field responses. Inversion uncertainties introduced by the described EM inversion will be propagated to petro-physical inversion models as well, and the overall inversion quality is reflective of both inversion steps. In performing the match, other drilling or measurement parameters may also be used as input parameters.

At step 730, at least one processor may be used to estimate at least one parameter of interest using the measurements at the plurality of frequencies and a mixing model accounting for electrical effects on the measurements caused by the clay particles. This may include estimating an effective permittivity and an effective conductivity of the volume. The model may relate the dispersion between the measurements to the at least one parameter of interest. The parameter of interest may comprise at least one of: i) an electrical parameter of the volume; and ii) a textural parameter of the volume. The parameter of interest may be any or all of: i) resistivity of formation water; ii) water saturation; iii) CEC; iv) a textural parameter of the clay particles; v) permittivity of formation water; vi) clay type of clay particles; and $C_{EXP}$. The processing (e.g., inversion or other solution) may output at least the formation water resistivity and water saturation simultaneously, and may output additional parameters (e.g., $C_{EXP}$) a described herein simultaneously with the water resistivity and water saturation of the formation.

Estimating the parameter of interest may include modeling for electrical effects caused by at least one of: i) a surface conductivity of the clay particles; and ii) a textural property of the clay particles. The mixing model may be derived from a relationship of an effective permittivity of the volume to a corresponding volumetric factor (e.g., volume fraction) and a corresponding permittivity of each of a plurality of components of the volume. The components may comprise at least formation water and at least one of: i) the rock matrix of the formation; and ii) formation hydrocarbons. The model may relate the effective permittivity of the volume to a function of the corresponding permittivity of each of a plurality of components of the volume as modified by an operator. The operator may comprise a root of degree $C_{EXP}$, where $C_{EXP}$ is a positive real rational number.

Step 730 may include fitting a mixing model to dielectric measurements at a plurality of frequencies to estimate values for parameters of interest of the volume, such as, for example, $C_{EXP}$ and other parameters of interest such as salinity of the water of the formation, water saturation of the formation, and permittivity of the rock matrix of the formation. This may include performing an inversion. For example, the measurements may be used to perform an inversion for a value of the resistivity of formation water, a value of the water saturation, a value of the permittivity of the rock matrix, and a value of the $C_{EXP}$ simultaneously. Other examples may include estimating the at least one parameter of interest in dependence upon the effective permittivity; the effective conductivity; an estimated porosity; and an estimated temperature. At least one of lithology information and a volumetric analysis of the volume may be used to estimate a permittivity of a rock matrix within the volume.

Optional step 740 may include using the values resulting from the inversion to estimate other parameters of interest of the volume or the formation, including formation properties, such as, for example, clay type. Step 740 may include using a stochastic correlation library correlating the at least one permittivity parameter to a property of the clay particles to estimate the property.

Other, optional, steps may include evaluating the formation or modeling the formation using the parameters of interest, conducting secondary recovery operations in dependence upon the estimated parameters, the model, a location of a boundary, or combinations of these. Secondary recovery operations may include any or all of drilling operations, injection operations, production operations, and the like. For example, the method may include commencing, modifying, continuing, or halting one or more drilling or production operations in dependence upon a model of the formation characterizing particular volumes of interest as having particular properties (e.g., values of one or more parameters of interest). Example embodiments may include using the at least one processor to perform at least one of: i) storing the at least one parameter of interest in a computer memory; ii) transmitting the at least one parameter of interest uphole; or iii) displaying of the parameter of interest to an operating engineer.

Mathematical models, look-up tables, neural networks, or other models representing relationships between the signals and the values of the formation properties may be used to characterize the drilling operation, optimize one or more drilling parameters of a drilling operation, change direction of drilling, or otherwise modify drilling operations in the borehole. The system may carry out these actions through notifications, advice, and/or intelligent control.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors. "Tubular," as used herein, means one or more segments of tubular, including, for example, drill pipe, drill collar, mandrel and so on.

Processing of data may include use of a computer program implemented on a suitable non-transitory machine-readable medium (non-transitory computer-readable medium) that enables the processor to perform the control and processing. The non-transitory machine-readable medium may include ROMs, EPROMs, EAROMs, Flash Memories, Optical disks, and Hard disks. As noted above, the processing may be done downhole or at the surface, by using one or more processors. In addition, results of the processing, such as an image of permittivity or parameter values, can be stored on a suitable medium.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof. Herein, the term "information" may include one or more of: raw data, processed data, and signals.

The term "pad," as used herein, refers to that part of a logging tool that is pressed firmly against the borehole wall and holds sensors (e.g. an antenna assembly according to embodiments of this disclosure) to measure the parameter of interest of the earth formation. The pad may be extended from the tool body on an arm or may be incorporated into the tool body.

As described herein, "complex permittivity" refers to a permittivity having a real part, which is commonly called the dielectric constant, and an imaginary part, which is commonly called the dielectric loss factor or loss tangent.

The term "mixing model" refers a quantitatively expressed relation between the dielectric behavior of a mixture and the properties of its constituents. More specifically, in the context of the present disclosure, these constituents refer to the rock matrix of the formation and the water and hydrocarbon within. The relation may include details such as the volume fraction of each of these phases, their geometry and distribution within a representative volume of the formation, and electrical surface conductivity of particular particles. The term "simultaneously," as described herein, refers to output at the same time or iteration.

Estimated parameters of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

As used herein, the term "clay type" refers to characterization of the clay particles or a subset thereof as belonging predominantly to a group or member of a group of clays having a similar chemical composition, such as, for example, montmorillonite.

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

What is claimed is:

1. A method of evaluating a volume of an earth formation wherein the volume comprises a fluid-saturated rock matrix including clay particles, the method comprising:
    making measurements of complex permittivity at a plurality of frequencies using an electromagnetic tool in a borehole penetrating the earth;
    estimating a plurality of parameters of interest simultaneously by performing an inversion using the measurements at the plurality of frequencies and a mixing model accounting for electrical effects on the measurements caused by the clay particles wherein the mixing model relates the effective permittivity of the volume to a function of the corresponding permittivity of each of a plurality of components of the volume, the function of the corresponding permittivity of each of the plurality of components of the volume comprising a root of degree $C_{EXP}$ applied to the corresponding permittivity of each of the plurality of components, where $C_{EXP}$ is constrained to be a positive rational number, the plurality of parameters comprising a value for $C_{EXP}$ generated as output from the inversion and at least one of: i) water saturation; and ii) resistivity of formation water.

2. The method of claim 1 comprising modeling for electrical effects caused by at least one of: i) a surface conductivity of the clay particles; and ii) a textural property of the clay particles.

3. The method of claim 1 wherein the plurality of parameters comprises at least one of: i) an additional electrical parameter of the volume; and ii) a textural parameter of the volume.

4. The method of claim 1, wherein the mixing model is derived from a relationship of an effective permittivity of the volume to a corresponding volumetric factor and a corresponding permittivity of each of a plurality of components of the volume.

5. The method of claim 4, wherein the components comprise at least formation water and at least one of: i) the rock matrix of the formation; and ii) formation hydrocarbons.

6. The method of claim 5, wherein the plurality of parameters comprises a volumetric factor for at least the formation water and at least one of: i) the rock matrix of the formation; and ii) the formation hydrocarbons.

7. The method of claim 1, further comprising:
    using at least one processor to estimate an effective permittivity and an effective conductivity of the volume.

8. The method of claim 7, further comprising:
    estimating the at least one parameter of interest in dependence upon the effective permittivity; the effective conductivity; an estimated porosity; and an estimated temperature.

9. The method of claim 8, further comprising:
    estimating a permittivity of a rock matrix within the volume using at least one of: i) lithology information, and ii) a volumetric analysis of the volume.

10. The method of claim 1 wherein the at least one parameter of interest comprises at least one of: i) cation exchange capacity (CEC);
    ii) a textural parameter of the clay particles; iii) permittivity of formation water; iv) clay type of clay particles.

11. The method of claim 4, wherein the model relates dispersion between the measurements to the plurality of parameters of interest.

12. The method of claim 1, wherein the plurality of parameters of interest comprise resistivity of formation water, water saturation, and permittivity of the rock matrix; and wherein estimating the plurality of parameters of interest comprises using the measurements to perform an inversion for a value of the resistivity of formation water, a value of the water saturation, a value of the permittivity of the rock matrix, and a value of the $C_{EXP}$ simultaneously.

13. The method of claim 1, further comprising using a stochastic correlation library correlating the plurality of parameters of interest to a property of the clay particles to estimate the property.

14. The method of claim 1, further comprising:
    conveying the electromagnetic tool in the borehole.

15. The method of claim 1, wherein the electromagnetic tool uses electrical induction.

16. The method of claim 1, wherein estimating the plurality of parameters of interest comprises using measurements from five different frequencies in an inversion.

17. An apparatus for evaluating a volume of an earth formation wherein the volume comprises a fluid-saturated rock matrix including clay particles, the apparatus comprising:
    a carrier configured to be conveyed in a borehole penetrating the earth formation;
    an electromagnetic tool disposed on the carrier and configured to make measurements of complex permittivity of a volume of the earth formation proximate the tool at a plurality of frequencies; and
    at least one processor configured to:
    estimating a plurality of parameters of interest simultaneously by performing an inversion using the measurements at the plurality of frequencies and a mixing model accounting for electrical effects on the measurements caused by the clay particles, wherein the mixing model relates the effective permittivity of the volume to a function of the corresponding permittivity of each of a plurality of components of the volume, the function of the corresponding permittivity of each of the plurality of components of the volume comprising a root of degree $C_{EXP}$ applied to the corresponding permittivity of each of the plurality of components, where $C_{EXP}$ is constrained to be a positive rational number, the plurality of parameters comprising a value for CEXP generated as output from the inversion and at least one of: i) water saturation; and ii) resistivity of formation water.

* * * * *